(12) United States Patent　　(10) Patent No.: US 12,163,326 B1
Grumbach et al.　　(45) Date of Patent: Dec. 10, 2024

(54) SYSTEM FOR CAPTURING AND DESTROYING HAIR OR WASTE WITHIN A COMMERCIAL SHOWER DRAIN

(71) Applicant: NeverClog LLC, Boston, MA (US)

(72) Inventors: Geoffrey J. Grumbach, Cambridge, MA (US); John Deluca, III, Attleboro, MA (US); Olaoluwa Faleye, Oakland, CA (US); Jacqueline Kirk, New York, NY (US)

(73) Assignee: NeverClog, LLC, Boston, MA (US)

( * ) Notice: Subject to any disclaimer, the term of this patent is extended or adjusted under 35 U.S.C. 154(b) by 285 days.

(21) Appl. No.: 17/929,038

(22) Filed: Sep. 1, 2022

Related U.S. Application Data

(63) Continuation-in-part of application No. 17/575,072, filed on Jan. 13, 2022, now abandoned, which is a continuation of application No. 17/207,803, filed on Mar. 22, 2021, now Pat. No. 11,242,678, which is a continuation of application No. 16/996,301, filed on Aug. 18, 2020, now Pat. No. 10,982,425.

(60) Provisional application No. 62/908,626, filed on Oct. 1, 2019.

(51) Int. Cl.
　　*E03F 5/04*　　(2006.01)
　　*C02F 3/34*　　(2023.01)
　　*E03C 1/266*　　(2006.01)

(52) U.S. Cl.
　　CPC .......... *E03F 5/0408* (2013.01); *C02F 3/342* (2013.01); *E03C 1/2665* (2013.01); *E03F 5/041* (2013.01)

(58) Field of Classification Search
　　None
　　See application file for complete search history.

(56) References Cited

U.S. PATENT DOCUMENTS

| 4,386 | A | * | 2/1846 | Jennison | B01D 24/38 |
| | | | | | 285/289.1 |
| 118,548 | A | * | 8/1871 | Oliver | E03C 1/264 |
| | | | | | 4/292 |
| 157,957 | A | * | 12/1874 | Atwater | E03C 1/264 |
| | | | | | 4/291 |
| 212,614 | A | * | 2/1879 | Magee | E03C 1/264 |
| | | | | | 4/291 |
| 214,982 | A | * | 5/1879 | Atwater | E03C 1/264 |
| | | | | | 4/291 |
| 243,002 | A | * | 6/1881 | Stevens | E03C 1/264 |
| | | | | | 4/286 |

(Continued)

*Primary Examiner* — Robert J Popovics
(74) *Attorney, Agent, or Firm* — Patent GC LLC; Peter Gordon

(57) ABSTRACT

A system for capturing and destroying hair and waste within a commercial shower drain includes a drain basket placed in the drain and a chemical blend that is poured into the drain basket. The drain basket captures hair and waste that is washed down shower drains. The chemical blend is poured into the drain basket to neutralize the captured hair or waste. The result is a clear drain and clear plumbing, with minimal manual labor. The drain basket does not require removal because the hair and waste are neutralized within the drain basket before a clog can develop. The chemical blend is strong enough to neutralize significant quantities of waste within minutes and is safer for both users and the plumbing systems treated than conventional drain cleaning chemicals.

20 Claims, 8 Drawing Sheets

SECTION L-L

(56) References Cited

U.S. PATENT DOCUMENTS

| | | | | | |
|---|---|---|---|---|---|
| 243,648 A * | 6/1881 | Stimpson | E03C 1/264 | | 4/291 |
| 286,951 A * | 10/1883 | McBee | B01D 29/05 | | 210/247 |
| 287,246 A * | 10/1883 | Coomber | E03C 1/264 | | 4/291 |
| 328,354 A * | 10/1885 | Stears | E03C 1/23 | | 4/689 |
| 381,990 A * | 5/1888 | Driller | E04D 13/08 | | 210/446 |
| 394,213 A * | 12/1888 | Scannell | E03C 1/264 | | 4/289 |
| 412,195 A * | 10/1889 | Marker | E03C 1/264 | | 285/368 |
| 414,240 A * | 11/1889 | Norton | B63B 13/00 | | 210/418 |
| 427,447 A * | 5/1890 | Thomson | B01D 35/02 | | 210/497.3 |
| 470,192 A * | 3/1892 | Gross | B01D 24/10 | | 210/497.3 |
| 513,215 A * | 1/1894 | Strater | A47J 31/06 | | 210/477 |
| 534,718 A * | 2/1895 | Johns | E03C 1/262 | | 4/287 |
| 557,075 A * | 3/1896 | Langer | B01D 29/15 | | 210/489 |
| 596,763 A * | 1/1898 | Stretch | E03C 1/264 | | 4/291 |
| 628,146 A * | 7/1899 | Hungerbuehler | E03C 1/264 | | 4/291 |
| 711,535 A * | 10/1902 | Scholl | B01D 35/02 | | 210/433.1 |
| 730,356 A * | 6/1903 | Emond | B01D 29/56 | | 210/311 |
| 744,060 A * | 11/1903 | Frye | B01D 29/085 | | 4/290 |
| 746,949 A * | 12/1903 | Gardner | A23L 7/13 | | 210/497.3 |
| 751,918 A * | 2/1904 | Jagger | B01D 35/02 | | 210/454 |
| 769,001 A * | 8/1904 | Lawrence | E03C 1/264 | | 4/291 |
| 774,953 A * | 11/1904 | Rieker et al. | A61J 19/04 | | 4/256.1 |
| 801,220 A * | 10/1905 | Cooper | A61C 17/04 | | 4/263 |
| 810,973 A * | 1/1906 | Pattenden | E03C 1/126 | | 4/294 |
| 814,481 A * | 3/1906 | Savard | A47K 3/02 | | 4/584 |
| 833,072 A * | 10/1906 | MacDonald | E03D 13/00 | | 137/247.35 |
| 852,044 A * | 4/1907 | Van der Minden | E03C 1/264 | | 4/291 |
| 858,234 A * | 6/1907 | Treager | E03C 1/264 | | 210/454 |
| 861,493 A * | 7/1907 | Bell | B01D 35/02 | | 210/447 |
| 929,727 A * | 8/1909 | Sullivan | E03C 1/264 | | 285/305 |
| 938,607 A * | 11/1909 | Reed | E03C 1/264 | | 4/293 |
| 960,901 A * | 6/1910 | Hall | B01D 35/30 | | 210/232 |
| 965,836 A * | 7/1910 | Ray | B01D 29/0054 | | 4/291 |
| 972,676 A * | 10/1910 | Bropson | E03C 1/264 | | 4/652 |
| 989,410 A * | 4/1911 | Peters | E03C 1/264 | | 4/291 |
| 1,014,223 A * | 1/1912 | Hunsicker | E03C 1/264 | | 4/291 |
| 1,035,733 A * | 8/1912 | Pierce | E03C 1/264 | | 4/291 |
| 1,083,990 A * | 1/1914 | Collins | E03C 1/264 | | 4/291 |
| 1,115,016 A * | 10/1914 | Pheils | B65F 1/1447 | | 193/11 |
| 1,116,544 A * | 11/1914 | Barker | E03C 1/264 | | 4/291 |
| 1,155,070 A * | 9/1915 | Kessler | B60K 15/04 | | 210/172.6 |
| 1,161,766 A * | 11/1915 | Ferran | E03C 1/264 | | 166/227 |
| 1,177,277 A * | 3/1916 | Schaub | B01D 35/027 | | 210/473 |
| 1,192,134 A * | 7/1916 | Stevens | G01F 23/58 | | 73/306 |
| 1,270,648 A * | 6/1918 | Mills | E03C 1/264 | | 4/289 |
| 1,292,856 A * | 1/1919 | Niblo | E03C 1/262 | | 4/652 |
| 1,313,153 A * | 8/1919 | Zboyan | E03C 1/264 | | 4/291 |
| 1,333,433 A * | 3/1920 | Maisano | E03C 1/264 | | 4/291 |
| 1,342,046 A * | 6/1920 | Heino | E03C 1/264 | | 285/192 |
| 1,389,401 A * | 8/1921 | Van Nostrand | B01D 29/15 | | 210/508 |
| 1,390,345 A * | 9/1921 | Dunn | E03C 1/264 | | 4/292 |
| 1,394,011 A * | 10/1921 | Hills | B01D 35/02 | | 210/313 |
| 1,415,217 A * | 5/1922 | Brock | B60K 15/04 | | 210/473 |
| 1,424,022 A * | 7/1922 | Lacoste | E03C 1/264 | | 4/291 |
| 1,436,294 A * | 11/1922 | Scott | B60K 15/0406 | | 210/473 |
| 1,449,300 A * | 3/1923 | Scott | E03C 1/264 | | 4/291 |
| 1,451,136 A * | 4/1923 | Allnutt | F01P 11/0214 | | 137/526 |
| 1,467,772 A * | 9/1923 | Appelhoff | E03C 1/264 | | 4/291 |
| 1,494,882 A * | 5/1924 | Barger | E03C 1/264 | | 4/292 |
| 1,515,073 A * | 11/1924 | Savard | E03C 1/264 | | 4/289 |
| 1,553,395 A * | 9/1925 | Ressler | A62C 4/00 | | 210/172.6 |
| 1,570,461 A * | 1/1926 | Cohn | A62C 4/00 | | 220/88.2 |
| 1,573,067 A * | 2/1926 | Holland | E04D 13/0409 | | 210/463 |
| 1,581,947 A * | 4/1926 | Hobbs | B01D 35/023 | | 210/473 |
| 1,589,544 A * | 6/1926 | Natow | E03C 1/264 | | 4/290 |
| 1,593,087 A * | 7/1926 | Logan | E03C 1/264 | | 4/291 |
| 1,594,361 A * | 8/1926 | Frankenstein | E03C 1/264 | | D23/209 |
| 1,596,362 A * | 8/1926 | McDonald | B01D 35/023 | | 210/305 |
| 1,596,893 A * | 8/1926 | Schifter | E03C 1/262 | | 4/292 |
| 1,596,894 A * | 8/1926 | Schifter | E03C 1/262 | | 4/287 |
| 1,604,048 A * | 10/1926 | Hobbs | B01D 35/023 | | 210/172.6 |
| 1,608,966 A * | 11/1926 | Tanaka | E03C 1/282 | | 210/453 |
| 1,612,588 A * | 12/1926 | Lacoste | E03C 1/264 | | 4/291 |
| 1,618,679 A * | 2/1927 | Schifter | E03C 1/26 | | 4/292 |

(56) References Cited

U.S. PATENT DOCUMENTS

| | | | | | |
|---|---|---|---|---|---|
| 1,622,652 | A | * | 3/1927 | Lang | E03F 5/0407 210/247 |
| 1,661,983 | A | * | 3/1928 | Wentzel | E03C 1/264 4/291 |
| RE16,994 | E | * | 6/1928 | Cohn | F16K 24/04 210/172.6 |
| 1,677,118 | A | * | 7/1928 | Ford | B01D 29/23 210/473 |
| 1,693,741 | A | * | 12/1928 | Wuest | B01D 29/23 210/489 |
| 1,704,634 | A | * | 3/1929 | Snider | B01D 35/02 210/497.3 |
| 1,706,000 | A | * | 3/1929 | Settles | E03C 1/264 4/291 |
| 1,711,093 | A | * | 4/1929 | Helman | B01D 35/023 210/463 |
| 1,730,083 | A | * | 10/1929 | Melfi | E03C 1/264 4/292 |
| 1,756,290 | A | * | 4/1930 | Hibner | E03C 1/264 4/289 |
| 1,757,285 | A | * | 5/1930 | Anschicks | F16K 17/19 210/172.6 |
| 1,757,977 | A | * | 5/1930 | Salvatore | E03C 1/264 4/292 |
| 1,763,864 | A | * | 6/1930 | Robertson | E03C 1/264 4/289 |
| 1,770,639 | A | * | 7/1930 | Sanders | E03C 1/23 4/286 |
| 1,773,547 | A | * | 8/1930 | Robertson | E03C 1/262 4/287 |
| 1,814,656 | A | * | 7/1931 | Anschicks | B65D 25/385 210/172.6 |
| 1,817,283 | A | * | 8/1931 | Worswick | E03C 1/264 4/291 |
| 1,817,376 | A | * | 8/1931 | Izquierdo | E03C 1/282 4/256.1 |
| 1,835,447 | A | * | 12/1931 | Alland | E03C 1/264 4/287 |
| 1,855,904 | A | * | 4/1932 | Brown | B01D 35/28 210/477 |
| 1,880,962 | A | * | 10/1932 | Koppelman | E03D 13/005 D23/366 |
| 1,886,676 | A | * | 11/1932 | Heuacker | E03C 1/264 4/256.1 |
| 1,903,366 | A | * | 4/1933 | Mercier | E03C 1/264 4/292 |
| 1,933,486 | A | * | 10/1933 | Simmonds | A62C 4/00 220/86.3 |
| 1,935,128 | A | * | 11/1933 | Pullman | E03C 1/264 4/DIG. 14 |
| 1,950,817 | A | * | 3/1934 | Rossman | E03C 1/264 4/291 |
| 1,966,074 | A | * | 7/1934 | Fuld | E03D 9/032 D23/366 |
| 1,976,975 | A | * | 10/1934 | Williams | B60K 15/0406 220/86.3 |
| 1,988,669 | A | * | 1/1935 | Sommerfeld | E04D 13/0409 210/166 |
| 1,996,279 | A | * | 4/1935 | Dillon | E03C 1/264 D23/209 |
| 2,010,445 | A | * | 8/1935 | Sparks | B60K 15/04 220/86.3 |
| 2,019,799 | A | * | 11/1935 | Seguin | E03C 1/264 4/291 |
| 2,024,475 | A | * | 12/1935 | Rossman | E03C 1/264 4/287 |
| 2,028,520 | A | * | 1/1936 | Phillips | B01D 29/117 210/455 |
| 2,038,852 | A | * | 4/1936 | Pasman | E03C 1/264 4/291 |
| 2,043,088 | A | * | 6/1936 | Zinkil | A47K 1/14 4/689 |
| 2,046,214 | A | * | 6/1936 | Selig | E03D 9/032 4/222.1 |
| 2,048,704 | A | * | 7/1936 | Kraus | E03C 1/264 4/286 |
| 2,059,524 | A | * | 11/1936 | Hoffman | E03D 13/005 4/222.1 |
| 2,075,443 | A | * | 3/1937 | Kirschner | E03C 1/262 4/287 |
| 2,077,516 | A | * | 4/1937 | Dart | E03C 1/308 4/286 |
| 2,079,038 | A | * | 5/1937 | Ranish | E03C 1/262 4/291 |
| 2,087,341 | A | * | 7/1937 | Farmer | E03D 13/005 4/287 |
| 2,087,592 | A | * | 7/1937 | Chesnut | E03C 1/126 252/189 |
| 2,130,943 | A | * | 9/1938 | Boisvert | E03C 1/264 4/652 |
| 2,140,436 | A | * | 12/1938 | Vanerstrom | E03C 1/264 4/674 |
| 2,145,759 | A | * | 1/1939 | Fellows | B60K 15/0403 210/172.6 |
| 2,171,133 | A | * | 8/1939 | Stanton | E03C 1/232 4/584 |
| 2,172,031 | A | * | 9/1939 | Norman | C02F 1/003 210/473 |
| 2,186,998 | A | * | 1/1940 | Stein | E03C 1/264 4/291 |
| 2,190,278 | A | * | 2/1940 | Wiedoff | E03C 1/262 4/287 |
| 2,225,693 | A | * | 12/1940 | Frances | E03C 1/264 4/291 |
| 2,233,234 | A | * | 2/1941 | Wilson | E03C 1/264 4/291 |
| 2,236,884 | A | * | 4/1941 | Zinkil | E03C 1/262 4/287 |
| 2,236,886 | A | * | 4/1941 | Zinkil | E03C 1/262 4/287 |
| 2,257,944 | A | * | 10/1941 | Fischbein | A47J 31/06 210/497.3 |
| 2,285,833 | A | * | 6/1942 | Platt | E03C 1/264 239/548 |
| 2,313,266 | A | * | 3/1943 | Roberts | B60K 15/0403 220/86.3 |
| 2,317,707 | A | * | 4/1943 | Yavitch | E03C 1/264 4/292 |
| 2,331,055 | A | * | 10/1943 | Smith | E03C 1/264 4/291 |
| 2,337,331 | A | * | 12/1943 | Kirschner | E03C 1/262 4/287 |
| 2,348,093 | A | * | 5/1944 | Pasman | E03C 1/23 4/287 |
| 2,351,526 | A | * | 6/1944 | Lebus | B60K 15/0406 210/172.6 |
| 2,364,960 | A | * | 12/1944 | Dunn | E03C 1/26 4/291 |
| 2,429,435 | A | * | 10/1947 | Vartanian | E03C 1/262 4/287 |
| 2,438,302 | A | * | 3/1948 | Simcich | A47J 31/043 4/286 |
| 2,464,579 | A | * | 3/1949 | Hovanian | E03C 1/262 210/418 |
| 2,472,322 | A | * | 6/1949 | Weissman | E03C 1/29 137/247.35 |
| 2,481,312 | A | * | 9/1949 | Kirschner | E03C 1/262 4/287 |
| 2,491,796 | A | * | 12/1949 | Baume | F16L 55/24 210/497.3 |
| 2,505,305 | A | * | 4/1950 | Schaefer | E03C 1/264 4/289 |
| 2,506,669 | A | * | 5/1950 | Heuacker | E03C 1/264 220/86.3 |
| 2,512,394 | A | * | 6/1950 | Sullivan | D06F 39/10 D23/209 |
| 2,524,313 | A | * | 10/1950 | Gerling | B67D 7/42 210/309 |

(56) References Cited

U.S. PATENT DOCUMENTS

| | | | | |
|---|---|---|---|---|
| 2,548,541 A * | 4/1951 | MacDonald | E03C 1/282 | 210/434 |
| 2,569,615 A * | 10/1951 | Forest | E03C 1/264 | 4/287 |
| 2,647,636 A * | 8/1953 | Rafferty | B01D 35/023 | 210/446 |
| 2,680,251 A * | 6/1954 | Cotterman | E03C 1/264 | 4/292 |
| 2,690,232 A * | 9/1954 | Brem | E03C 1/282 | 210/450 |
| 2,723,905 A * | 11/1955 | Coakley | E03C 1/30 | 134/93 |
| 2,732,946 A * | 1/1956 | Schaub | B05B 15/40 | 210/497.3 |
| 2,733,775 A * | 2/1956 | Dupure | B01D 35/023 | 210/348 |
| 2,739,317 A * | 3/1956 | Abresch | E03C 1/264 | 285/354 |
| 2,779,478 A * | 1/1957 | Wahlin | B21B 45/08 | 210/462 |
| 3,109,459 A * | 11/1963 | Lee, II | F15B 21/00 | 138/40 |
| 3,112,499 A * | 12/1963 | Thornton | E03C 1/126 | 422/5 |
| 3,144,408 A * | 8/1964 | Pascual | E03C 1/264 | 210/538 |
| 3,245,540 A * | 4/1966 | Johnson | B01D 24/12 | 210/291 |
| 3,281,869 A * | 11/1966 | Schweigaard-Olsen | E03C 1/264 | 210/166 |
| 3,322,282 A * | 5/1967 | Lyman | A47L 15/4206 | 210/418 |
| 3,450,207 A * | 6/1969 | Hirsch | E21B 43/088 | 166/236 |
| 3,456,799 A * | 7/1969 | Musial | B01D 35/023 | 210/91 |
| 3,469,700 A * | 9/1969 | Johnson | E04H 4/1236 | 210/167.16 |
| 3,517,813 A * | 6/1970 | Thaler | E04D 13/0409 | 210/166 |
| 3,570,022 A * | 3/1971 | Nealy | E03C 1/2306 | 4/287 |
| 3,665,526 A * | 5/1972 | Hoffman | A47K 1/14 | 4/287 |
| 3,702,013 A * | 11/1972 | Gebert | E03C 1/26 | 4/292 |
| 3,731,815 A * | 5/1973 | Collingwood | B01D 35/023 | 210/497.2 |
| 3,742,524 A * | 7/1973 | Ballentine | E03C 1/264 | 4/654 |
| 3,749,248 A * | 7/1973 | Dickinson | F01M 1/10 | 210/436 |
| 3,851,648 A * | 12/1974 | Brooke | A61K 9/2072 | 239/57 |
| 3,905,505 A * | 9/1975 | Gallay | B60K 15/077 | 220/563 |
| 3,912,638 A * | 10/1975 | Beaubien | B01D 29/085 | 210/482 |
| 3,982,289 A * | 9/1976 | Robbins | E03C 1/264 | 4/292 |
| 4,044,409 A * | 8/1977 | Hood | E03C 1/264 | 4/286 |
| 4,045,351 A * | 8/1977 | Peterson | B01D 35/02 | 4/652 |
| 4,092,747 A * | 6/1978 | Kessel | E03F 5/0405 | 4/286 |
| 4,135,899 A * | 1/1979 | Gauer | B01D 50/20 | 55/497 |
| 4,164,048 A * | 8/1979 | Kampfer | E03C 1/282 | 4/DIG. 14 |
| 4,179,762 A * | 12/1979 | Barnhardt | E03C 1/284 | 4/256.1 |
| 4,198,220 A * | 4/1980 | Keller | B01D 45/06 | 55/DIG. 37 |
| 4,199,827 A * | 4/1980 | Tuleja | E03C 1/282 | 4/290 |
| 4,207,631 A * | 6/1980 | Baggey | E03C 1/264 | 4/291 |
| 4,211,543 A * | 7/1980 | Tokar | B01D 46/0004 | 55/497 |
| 4,224,701 A * | 9/1980 | Huang | E03C 1/126 | 4/294 |
| 4,278,455 A * | 7/1981 | Nardi | B01D 46/64 | 55/482 |
| 4,380,834 A * | 4/1983 | Wentz | E03C 1/23 | 4/286 |
| 4,397,745 A * | 8/1983 | Troller | B01D 35/027 | 210/406 |
| 4,418,722 A * | 12/1983 | Kendall | C10J 3/74 | 138/42 |
| 4,443,897 A * | 4/1984 | Austin | E03C 1/26 | 4/291 |
| 4,460,462 A * | 7/1984 | Arneson | E04H 4/1236 | 210/167.16 |
| 4,495,073 A * | 1/1985 | Beimgraben | B01D 35/02 | 166/227 |
| D279,379 S * | 6/1985 | Uram | D7/400 | |
| 4,574,400 A * | 3/1986 | Annowsky | E03C 1/26 | 4/290 |
| 4,640,771 A * | 2/1987 | Whalen | B01D 35/0273 | 210/167.01 |
| 4,650,087 A * | 3/1987 | White | B60K 15/0403 | 220/86.3 |
| 4,792,448 A * | 12/1988 | Ranade | A61K 9/0068 | 424/467 |
| 4,839,038 A * | 6/1989 | McLain, II | B01D 29/15 | 73/202 |
| 4,849,105 A * | 7/1989 | Borchert | B01D 29/33 | 210/411 |
| 4,851,118 A * | 7/1989 | Kurihara | F02M 37/50 | 210/485 |
| 4,860,805 A * | 8/1989 | Townsend | A47C 27/085 | 210/485 |
| 4,861,478 A * | 8/1989 | Hall | B01D 35/04 | 141/286 |
| 4,890,791 A * | 1/1990 | Hoffman | A61L 9/127 | 239/326 |
| 4,932,082 A * | 6/1990 | Ridgeway | E03C 1/2302 | 4/287 |
| 4,949,406 A * | 8/1990 | Canelli | E03C 1/282 | 4/256.1 |
| D316,594 S * | 4/1991 | Yuen | D23/261 | |
| 5,019,346 A * | 5/1991 | Richter | A61L 2/18 | 4/225.1 |
| 5,025,946 A * | 6/1991 | Butkovich | B67D 7/344 | 220/86.3 |
| 5,049,273 A * | 9/1991 | Knox | B01D 29/117 | 210/406 |
| 5,197,455 A * | 3/1993 | Tessien | F23Q 7/02 | 126/144 |
| 5,241,979 A * | 9/1993 | Chang | B01D 29/031 | 137/550 |
| 5,297,299 A * | 3/1994 | Wilson | E03C 1/264 | 4/290 |
| 5,300,224 A * | 4/1994 | Farley | C02F 1/003 | 210/282 |
| 5,312,545 A * | 5/1994 | Starin | B01D 35/027 | 210/172.6 |
| 5,312,624 A * | 5/1994 | Richter | C09D 5/34 | 4/231 |
| 5,342,627 A * | 8/1994 | Chopra | A61K 9/2072 | 424/471 |
| 5,354,468 A * | 10/1994 | Richards | E03C 1/126 | 210/477 |
| D357,306 S * | 4/1995 | Lenox | D23/260 | |

(56) References Cited

U.S. PATENT DOCUMENTS

| | | | |
|---|---|---|---|
| 5,442,819 A * | 8/1995 | Penor | E03C 1/26 4/288 |
| 5,500,115 A * | 3/1996 | Nehm | E03C 1/08 428/118 |
| 5,520,802 A * | 5/1996 | Brubaker | B01D 35/027 210/172.6 |
| 5,588,635 A * | 12/1996 | Hartman | F16K 47/08 138/44 |
| D396,603 S * | 8/1998 | Gasser | D7/400 |
| 5,888,260 A * | 3/1999 | Sica | B01D 46/0012 55/331 |
| 5,897,787 A * | 4/1999 | Keller | B01D 29/96 210/477 |
| 5,915,847 A * | 6/1999 | Spears | E03C 1/262 4/293 |
| 5,916,435 A * | 6/1999 | Spearman | B01D 29/23 210/132 |
| 5,925,241 A * | 7/1999 | Aldridge | B01J 20/20 96/147 |
| 5,935,435 A * | 8/1999 | Hasler | B01D 29/23 210/473 |
| 6,000,433 A * | 12/1999 | Carroll | B01D 46/10 138/44 |
| 6,014,987 A * | 1/2000 | List | B64D 37/08 137/590 |
| 6,016,579 A * | 1/2000 | Erbs | E03C 1/182 4/291 |
| 6,067,669 A * | 5/2000 | Peterson | E03C 1/262 4/291 |
| 6,088,844 A * | 7/2000 | Killham | E03C 1/262 4/295 |
| 6,105,787 A * | 8/2000 | Malkin | B01D 29/15 210/488 |
| 6,108,828 A * | 8/2000 | Cheng | A47K 1/14 4/286 |
| 6,173,455 B1 * | 1/2001 | Nordstrom | E03C 1/264 4/292 |
| 6,195,819 B1 * | 3/2001 | Wang | E03C 1/23 4/689 |
| 6,197,321 B1 * | 3/2001 | Richter | A61L 11/00 4/290 |
| 6,200,484 B1 * | 3/2001 | McInnis | E03F 5/0401 210/170.03 |
| 6,217,757 B1 * | 4/2001 | Fleischmann | E03F 5/0404 210/166 |
| 6,254,770 B1 * | 7/2001 | Remon | E03F 5/0404 210/163 |
| 6,263,518 B1 * | 7/2001 | Magtanong | E03C 1/26 4/290 |
| 6,276,000 B1 * | 8/2001 | Saman | E03C 1/262 4/295 |
| 6,279,751 B1 * | 8/2001 | Malkin | B01D 29/96 210/488 |
| 6,308,350 B1 * | 10/2001 | Marchionda | E03C 1/282 4/679 |
| D450,106 S * | 11/2001 | Herr | D23/261 |
| 6,315,896 B1 * | 11/2001 | Johnson | B01D 35/02 4/291 |
| 6,318,564 B1 * | 11/2001 | Archibald | B01D 29/35 210/497.3 |
| 6,387,261 B1 * | 5/2002 | Mojena | B01D 24/042 210/488 |
| 6,468,427 B1 * | 10/2002 | Frey | B01D 29/111 210/500.27 |
| 6,487,729 B2 * | 12/2002 | Delanzo | E03C 1/264 4/286 |
| 6,491,814 B1 * | 12/2002 | Wheeler | E03C 1/264 4/294 |
| 6,558,538 B2 * | 5/2003 | Scuilla | E03C 1/126 4/679 |
| D495,458 S * | 8/2004 | Baldinger | D32/30 |
| 6,866,440 B1 * | 3/2005 | Bart | A47K 1/14 4/295 |
| 6,915,814 B2 * | 7/2005 | Cheng | E03C 1/126 137/546 |
| 6,959,457 B2 * | 11/2005 | Hernandez | F24F 7/02 454/4 |
| 6,978,528 B1 * | 12/2005 | Stallings | B25B 23/0085 294/219 |
| 6,997,636 B2 * | 2/2006 | Tremouilhac | E03F 5/046 404/5 |
| 7,013,500 B1 * | 3/2006 | Lin | E03C 1/262 4/290 |
| 7,098,174 B2 * | 8/2006 | Takemura | A01N 35/08 510/447 |
| 7,122,117 B1 * | 10/2006 | Goldring | E03F 5/0407 114/364 |
| 7,128,834 B2 * | 10/2006 | Davenport | B01D 35/02 4/DIG. 14 |
| 7,150,576 B1 * | 12/2006 | Kambeyanda | E03C 1/282 401/292 |
| 7,186,333 B2 * | 3/2007 | Kluge | E03F 1/00 210/691 |
| D550,819 S * | 9/2007 | Seehoff | D23/261 |
| D553,226 S * | 10/2007 | Wisek | D23/268 |
| 7,300,573 B1 * | 11/2007 | Trangsrud | E03F 1/00 210/474 |
| 7,318,374 B2 * | 1/2008 | Guerrero | A47J 31/0626 99/321 |
| D563,161 S * | 3/2008 | Bodum | D7/400 |
| D565,350 S * | 4/2008 | Gauger | D7/400 |
| 7,376,983 B1 * | 5/2008 | Sciarrino | E03C 1/264 4/288 |
| 7,429,322 B2 * | 9/2008 | Fujita | F02M 37/34 210/172.6 |
| 7,442,296 B2 * | 10/2008 | Chong | E03C 1/264 4/290 |
| 7,473,359 B1 * | 1/2009 | Barrett, II | B08B 9/0321 134/22.12 |
| 7,485,218 B2 * | 2/2009 | Dussich, I | E03F 1/00 210/255 |
| 7,540,953 B2 * | 6/2009 | Fitzgerald | C02F 1/004 210/170.03 |
| D599,444 S * | 9/2009 | Jones | D23/261 |
| D603,648 S * | 11/2009 | Bodum | D7/312 |
| D604,809 S * | 11/2009 | Mannella | D23/260 |
| 7,610,635 B2 * | 11/2009 | Schultz | E03C 1/126 4/689 |
| 7,615,148 B1 * | 11/2009 | Gentry | B01D 35/02 210/170.07 |
| 7,618,532 B2 * | 11/2009 | Worth | E03F 5/0407 239/57 |
| D605,733 S * | 12/2009 | Cavalieri | D23/261 |
| 7,625,488 B2 * | 12/2009 | Blackburn | E03C 1/264 4/679 |
| 7,704,386 B2 * | 4/2010 | Ventura | E03C 1/264 210/474 |
| 7,736,499 B2 * | 6/2010 | Chong | E03C 1/264 4/290 |
| 7,785,516 B2 * | 8/2010 | Malkin | B01D 29/15 264/DIG. 48 |
| 7,802,739 B2 * | 9/2010 | Scorvo | E03C 1/266 241/46.013 |
| 7,850,859 B2 * | 12/2010 | Tanner | C02F 1/003 210/473 |
| 7,854,852 B1 * | 12/2010 | Reavis | E03B 1/04 210/767 |
| 7,875,178 B2 * | 1/2011 | Ashliman | B01D 24/007 210/477 |
| 7,887,697 B2 * | 2/2011 | Worth | E03C 1/126 239/57 |
| 7,895,939 B2 * | 3/2011 | Pan | A47J 31/005 99/322 |
| D637,698 S * | 5/2011 | Greene | D23/268 |
| 7,959,799 B2 * | 6/2011 | Happel | E03F 1/00 210/166 |
| D643,508 S * | 8/2011 | Wilkinson | D23/209 |

(56) References Cited

U.S. PATENT DOCUMENTS

| | | | | |
|---|---|---|---|---|
| D644,072 S * | 8/2011 | McDonald | | D7/667 |
| 8,011,030 B2 * | 9/2011 | Li | | E03C 1/262 |
| | | | | 4/286 |
| 8,029,667 B2 * | 10/2011 | Santinon | | B60K 15/04 |
| | | | | 210/172.6 |
| 8,112,823 B2 * | 2/2012 | Dombrowski | | E03C 1/2665 |
| | | | | 241/46.016 |
| 8,136,173 B2 * | 3/2012 | Knox | | E03C 1/264 |
| | | | | 4/287 |
| D658,342 S * | 4/2012 | Danak | | D32/25 |
| 8,182,702 B2 * | 5/2012 | Al-Sannaa | | B01D 35/02 |
| | | | | 210/806 |
| D663,580 S * | 7/2012 | Vagnby | | D7/400 |
| 8,214,942 B2 * | 7/2012 | Yang | | E03C 1/262 |
| | | | | 4/690 |
| 8,221,813 B2 * | 7/2012 | Boul | | A47J 31/08 |
| | | | | 426/594 |
| 8,252,121 B2 * | 8/2012 | Brunswick | | A47L 15/241 |
| | | | | 134/186 |
| D669,969 S * | 10/2012 | Forrest | | D23/261 |
| 8,298,417 B2 * | 10/2012 | Lemay | | E03F 5/16 |
| | | | | 4/652 |
| 8,307,755 B2 * | 11/2012 | Shen | | A47J 31/005 |
| | | | | 220/709 |
| 8,316,474 B2 * | 11/2012 | Kang | | E03C 1/282 |
| | | | | 4/292 |
| D673,246 S * | 12/2012 | Lee | | D23/260 |
| 8,377,292 B2 * | 2/2013 | Patera | | C02F 1/003 |
| | | | | 210/473 |
| 8,382,993 B1 * | 2/2013 | Wisek | | E03C 1/26 |
| | | | | 137/550 |
| 8,409,433 B2 * | 4/2013 | Worth | | E03F 5/06 |
| | | | | 422/255 |
| 8,496,811 B2 * | 7/2013 | Cohen | | E03C 1/264 |
| | | | | 210/232 |
| 8,505,125 B1 * | 8/2013 | Chia | | E03C 1/264 |
| | | | | 4/290 |
| D691,418 S * | 10/2013 | Minton | | D7/400 |
| 8,561,524 B2 * | 10/2013 | DeMiglio | | A47J 31/0689 |
| | | | | 99/305 |
| 8,590,065 B2 * | 11/2013 | Ali | | E03C 1/262 |
| | | | | 4/287 |
| D694,579 S * | 12/2013 | Khubani | | D7/400 |
| D694,852 S * | 12/2013 | Gordon | | D23/209 |
| 8,608,956 B2 * | 12/2013 | Moulton | | E03F 5/0404 |
| | | | | 210/473 |
| D702,327 S * | 4/2014 | Dannrup | | D23/261 |
| 8,721,880 B2 * | 5/2014 | Worth | | E03F 5/06 |
| | | | | 422/255 |
| 8,746,480 B2 * | 6/2014 | Wholey | | B60K 15/0403 |
| | | | | 220/86.3 |
| D717,912 S * | 11/2014 | Huda | | D23/209 |
| D730,493 S * | 5/2015 | Sehl | | D23/261 |
| 9,021,621 B2 * | 5/2015 | Booker, Jr. | | E03C 1/262 |
| | | | | 4/290 |
| 9,051,192 B2 * | 6/2015 | Kent | | E03F 5/041 |
| 9,060,656 B2 * | 6/2015 | Tong | | E03C 1/23 |
| 9,131,810 B2 * | 9/2015 | Reile | | A47K 3/281 |
| 9,175,797 B1 * | 11/2015 | Behoteguy | | E03F 5/0404 |
| 9,187,885 B2 * | 11/2015 | Schulze | | E03C 1/262 |
| D746,417 S * | 12/2015 | Guterman | | D23/260 |
| D747,140 S * | 1/2016 | Roth | | D23/209 |
| D749,706 S * | 2/2016 | Johansen | | D23/260 |
| 9,322,156 B2 * | 4/2016 | McInnis | | E03F 5/0403 |
| D757,492 S * | 5/2016 | Ming | | D7/400 |
| 9,334,181 B2 * | 5/2016 | Worth | | E03F 5/041 |
| 9,371,636 B2 * | 6/2016 | Ali | | A47K 1/14 |
| D764,226 S * | 8/2016 | Ming | | D7/400 |
| D764,864 S * | 8/2016 | Hertaus | | D7/400 |
| 9,499,962 B2 * | 11/2016 | Joseph | | E03C 1/262 |
| 9,518,383 B2 * | 12/2016 | Lesmeister | | E03C 1/264 |
| D777,887 S * | 1/2017 | Johansen | | D23/261 |
| 9,593,473 B2 * | 3/2017 | Schulze | | E03C 1/262 |
| D783,134 S * | 4/2017 | Karnegie | | D23/261 |
| 9,611,630 B2 * | 4/2017 | Danhi | | E03C 1/22 |
| 9,611,631 B2 * | 4/2017 | Rosko | | E03C 1/2302 |
| 9,624,656 B2 * | 4/2017 | Colacino | | E03C 1/262 |
| D785,767 S * | 5/2017 | Karnegie | | E03C 1/264 |
| | | | | D23/261 |
| D792,562 S * | 7/2017 | Ali | | D23/261 |
| D794,759 S * | 8/2017 | Karnegie | | D23/261 |
| 9,752,306 B2 * | 9/2017 | Scamuffa | | E03C 1/264 |
| 9,868,627 B2 * | 1/2018 | Batistakis | | B67D 7/005 |
| 9,883,660 B2 * | 2/2018 | Naess | | E03C 1/264 |
| D812,183 S * | 3/2018 | McGavin | | D22/122 |
| D814,611 S * | 4/2018 | Karnegie | | D23/261 |
| D815,895 S * | 4/2018 | Roth | | D23/209 |
| 9,945,106 B2 * | 4/2018 | Ali | | E03C 1/262 |
| 9,976,295 B2 * | 5/2018 | Booker, Jr. | | E03C 1/20 |
| 9,982,418 B2 * | 5/2018 | Bennett | | E03B 7/095 |
| 9,994,465 B2 * | 6/2018 | Epstein | | E03F 5/041 |
| 10,024,039 B2 * | 7/2018 | Cheng | | E03C 1/264 |
| 10,053,960 B2 * | 8/2018 | Romero | | E21B 21/003 |
| D827,787 S * | 9/2018 | Karnegie | | D23/261 |
| D827,788 S * | 9/2018 | Karnegie | | D23/261 |
| D828,523 S * | 9/2018 | Karnegie | | D23/261 |
| 10,066,382 B2 * | 9/2018 | Muderlak | | E03D 13/007 |
| D832,408 S * | 10/2018 | St-Antoine | | D23/261 |
| 10,106,967 B2 * | 10/2018 | Sebolt | | E03C 1/262 |
| 10,113,303 B2 * | 10/2018 | Mardian | | E03F 5/06 |
| 10,124,281 B2 * | 11/2018 | Heilman | | E02B 11/00 |
| D836,756 S * | 12/2018 | Myers, II | | E03C 1/26 |
| | | | | D23/261 |
| D841,133 S * | 2/2019 | Karnegie | | D23/261 |
| 10,206,411 B2 * | 2/2019 | Lown | | A23F 3/18 |
| 10,221,550 B2 * | 3/2019 | Colacino | | E03C 1/264 |
| 10,301,803 B2 * | 5/2019 | Beck | | E03C 1/262 |
| D851,225 S * | 6/2019 | Karnegie | | D23/261 |
| 10,309,085 B1 * | 6/2019 | Choy | | E03C 1/262 |
| 10,328,366 B2 * | 6/2019 | Hudgens | | B01D 35/027 |
| 10,344,460 B2 * | 7/2019 | Karnegie | | E03C 1/264 |
| D855,782 S * | 8/2019 | Karnegie | | D23/261 |
| 10,422,114 B2 * | 9/2019 | Nahum | | E03C 1/22 |
| D862,664 S * | 10/2019 | Si | | D23/261 |
| D867,551 S * | 11/2019 | Xiang | | D23/261 |
| 10,463,999 B2 * | 11/2019 | Washington | | B01D 35/005 |
| 10,486,990 B2 * | 11/2019 | Epstein | | E03F 5/06 |
| 10,487,492 B2 * | 11/2019 | Boersma | | E03C 1/26 |
| 10,501,917 B2 * | 12/2019 | Ali | | E03C 1/262 |
| 10,519,617 B2 * | 12/2019 | Stephens | | B01D 35/02 |
| 10,519,638 B2 * | 12/2019 | Schuster | | E03C 1/262 |
| D873,376 S * | 1/2020 | Montague | | D23/209 |
| D873,972 S * | 1/2020 | Hayes | | D23/261 |
| D873,975 S * | 1/2020 | Chen | | D23/261 |
| 10,570,594 B2 * | 2/2020 | Karnegie | | E03C 1/262 |
| 10,570,595 B2 * | 2/2020 | Sebolt | | E03C 1/2302 |
| 10,577,785 B2 * | 3/2020 | Schuster | | E03C 1/262 |
| D880,660 S * | 4/2020 | Chen | | D23/261 |
| 10,626,591 B2 * | 4/2020 | Muderlak | | E03D 9/03 |
| 10,639,568 B1 * | 5/2020 | Carter | | B01D 35/02 |
| 10,648,256 B2 * | 5/2020 | Romero | | E21B 43/086 |
| 10,677,019 B2 * | 6/2020 | Romero | | E21B 28/00 |
| D890,889 S * | 7/2020 | Liu | | D23/261 |
| D890,890 S * | 7/2020 | Liu | | D23/261 |
| D900,285 S * | 10/2020 | Liu | | D23/261 |
| 10,792,525 B2 * | 10/2020 | Cray | | B67D 7/04 |
| 10,794,794 B2 * | 10/2020 | Bowdle | | G01M 9/065 |
| D900,982 S * | 11/2020 | Rosario | | D23/261 |
| D901,240 S * | 11/2020 | Armistead | | D23/209 |
| D901,646 S * | 11/2020 | Chen | | D23/261 |
| 10,844,588 B1 * | 11/2020 | Riley | | E03F 5/0404 |
| D904,577 S * | 12/2020 | Lian | | D23/261 |
| D905,206 S * | 12/2020 | Colacino | | D23/261 |
| 10,870,976 B2 * | 12/2020 | Karnegie | | E03C 1/264 |
| D911,402 S * | 2/2021 | Prymula | | D15/144.1 |
| 10,975,555 B1 * | 4/2021 | Junca | | E03C 1/304 |
| 10,982,425 B1 * | 4/2021 | Grumbach | | E03F 5/041 |
| 11,047,181 B2 * | 6/2021 | Romero | | E21B 43/086 |
| D927,250 S * | 8/2021 | Kruger | | D7/400 |
| D931,422 S * | 9/2021 | Drossman | | D23/261 |
| 11,142,897 B2 * | 10/2021 | Schuster | | B01D 29/31 |
| 11,162,251 B2 * | 11/2021 | Beck | | E03C 1/262 |

(56) References Cited

U.S. PATENT DOCUMENTS

| | | | | |
|---|---|---|---|---|
| 11,180,912 B2 * | 11/2021 | Chaves | | E03F 5/0408 |
| 11,199,253 B2 * | 12/2021 | Trimmer | | B01D 35/06 |
| D940,836 S * | 1/2022 | Beck | | D23/261 |
| 11,224,830 B2 * | 1/2022 | Wildermuth | | B01D 29/96 |
| 11,242,678 B2 * | 2/2022 | Grumbach | | C02F 3/342 |
| 11,357,238 B2 * | 6/2022 | Lown | | A47J 31/06 |
| 11,391,027 B1 * | 7/2022 | Ali | | A47K 1/14 |
| D962,701 S * | 9/2022 | Liu | | D7/400 |
| 11,434,630 B1 * | 9/2022 | Shah | | B01D 35/28 |
| 11,445,804 B1 * | 9/2022 | Heacock | | A46B 9/023 |
| D967,350 S * | 10/2022 | Erley | | D23/261 |
| D967,352 S * | 10/2022 | McClure | | D23/261 |
| 11,457,620 B1 * | 10/2022 | Broadwell, III | | F16L 55/24 |
| D969,965 S * | 11/2022 | Hogg | | D23/209 |
| 11,505,931 B2 * | 11/2022 | Cheng | | E03C 1/264 |
| D972,093 S * | 12/2022 | Shah | | D23/261 |
| 11,517,155 B2 * | 12/2022 | Ahuja | | E03C 1/23 |
| 11,519,161 B2 * | 12/2022 | Ahuja | | E03C 1/232 |
| D976,371 S * | 1/2023 | Zhu | | D23/261 |
| 11,603,649 B2 * | 3/2023 | Littlejohn | | E03C 1/264 |
| 11,608,621 B1 * | 3/2023 | Pilarczyk | | E03C 1/22 |
| D982,393 S * | 4/2023 | Orlov | | D7/665 |
| D983,939 S * | 4/2023 | Mayberry | | E03C 1/264 |
| | | | | D23/261 |
| 11,661,362 B2 * | 5/2023 | Say | | C02F 1/66 |
| | | | | 210/289 |
| 11,680,397 B2 * | 6/2023 | Ahuja | | E03C 1/2306 |
| | | | | 4/295 |
| D992,094 S * | 7/2023 | Ramkarran | | D23/261 |
| D992,698 S * | 7/2023 | Ramkarran | | D23/261 |
| D994,090 S * | 8/2023 | Li | | D23/261 |
| 11,753,806 B2 * | 9/2023 | Gwen | | E03C 1/264 |
| | | | | 210/787 |
| 11,753,812 B2 * | 9/2023 | Heide | | E03F 5/14 |
| | | | | 210/799 |
| D1,000,593 S * | 10/2023 | Chen | | D23/261 |
| 11,773,574 B2 * | 10/2023 | Ali | | E03C 1/2306 |
| | | | | 4/295 |
| 11,773,575 B2 * | 10/2023 | Kim | | E03C 1/264 |
| | | | | 4/652 |
| 11,825,974 B1 * | 11/2023 | Murphy | | A47J 19/005 |
| D1,006,963 S * | 12/2023 | Drossman | | D23/261 |
| D1,016,578 S * | 3/2024 | Schultz | | D23/209 |
| 11,927,002 B2 * | 3/2024 | Yazdani | | E03C 1/264 |
| 11,931,611 B2 * | 3/2024 | Cray | | B65D 25/385 |
| D1,021,014 S * | 4/2024 | Liu | | D23/259 |
| D1,024,283 S * | 4/2024 | Hazelton | | D23/261 |
| D1,024,284 S * | 4/2024 | Xiao | | D23/261 |
| D1,025,700 S * | 5/2024 | Wu | | D7/400 |
| 11,980,835 B2 * | 5/2024 | Zarraonandia | | B01D 29/33 |
| D1,032,798 S * | 6/2024 | Chen | | D23/261 |
| 12,017,940 B2 * | 6/2024 | Weaver | | E03B 1/041 |
| 12,018,489 B2 * | 6/2024 | Majocka | | E04D 13/0409 |
| 2001/0030150 A1 * | 10/2001 | Remon | | E03F 1/00 |
| | | | | 210/163 |
| 2002/0050473 A1 * | 5/2002 | Davenport | | E03C 1/264 |
| | | | | 210/447 |
| 2002/0144338 A1 * | 10/2002 | Delanzo | | E03C 1/264 |
| | | | | 4/286 |
| 2003/0178349 A1 * | 9/2003 | Bacon | | B01D 35/02 |
| | | | | 210/232 |
| 2004/0069704 A1 * | 4/2004 | Yamaguchi | | F02M 61/165 |
| | | | | 210/498 |
| 2004/0073992 A1 * | 4/2004 | Saman | | E03C 1/262 |
| | | | | 4/287 |
| 2004/0144703 A1 * | 7/2004 | Davenport | | E03C 1/264 |
| | | | | 210/447 |
| 2004/0255378 A1 * | 12/2004 | Tracy | | E03C 1/26 |
| | | | | 4/689 |
| 2005/0017019 A1 * | 1/2005 | Richter | | F15D 1/02 |
| | | | | 222/1 |
| 2005/0199537 A1 * | 9/2005 | Kluge | | E03F 5/0404 |
| | | | | 210/164 |
| 2006/0207922 A1 * | 9/2006 | Dussich | | E03F 5/0404 |
| | | | | 210/164 |
| 2006/0273002 A1 * | 12/2006 | Maymudes | | E03C 1/264 |
| | | | | 210/162 |
| 2007/0101870 A1 * | 5/2007 | Liu | | A47J 31/18 |
| | | | | 99/495 |
| 2007/0181486 A1 * | 8/2007 | Ashliman | | B01D 29/54 |
| | | | | 210/485 |
| 2007/0209988 A1 * | 9/2007 | Lemay | | C02F 3/348 |
| | | | | 210/209 |
| 2007/0262006 A1 * | 11/2007 | Worth | | E03F 5/041 |
| | | | | 210/164 |
| 2007/0272604 A1 * | 11/2007 | Chong | | E03C 1/264 |
| | | | | 210/163 |
| 2007/0290082 A1 * | 12/2007 | Scorvo | | E03C 1/266 |
| | | | | 241/20 |
| 2008/0073277 A1 * | 3/2008 | Paoluccio | | E03F 5/0404 |
| | | | | 210/163 |
| 2008/0168596 A1 * | 7/2008 | Findlay | | A61L 9/05 |
| | | | | 4/287 |
| 2008/0169228 A1 * | 7/2008 | Ventura | | E03C 1/264 |
| | | | | 210/164 |
| 2008/0178382 A1 * | 7/2008 | Pinette | | E03C 1/2306 |
| | | | | 4/689 |
| 2008/0230469 A1 * | 9/2008 | Cherveny | | E03C 1/264 |
| | | | | 210/455 |
| 2009/0007321 A1 * | 1/2009 | Kang | | E03C 1/282 |
| | | | | 4/292 |
| 2009/0026285 A1 * | 1/2009 | Worth | | E03F 5/0407 |
| | | | | 239/57 |
| 2009/0151060 A1 * | 6/2009 | Zubillaga | | E03C 1/262 |
| | | | | 4/292 |
| 2009/0172870 A1 * | 7/2009 | Hong | | E03C 1/244 |
| | | | | 4/286 |
| 2009/0271920 A1 * | 11/2009 | Viggiano | | E03C 1/264 |
| | | | | 4/292 |
| 2010/0000011 A1 * | 1/2010 | Angarita | | E03C 1/262 |
| | | | | 4/292 |
| 2010/0071122 A1 * | 3/2010 | Li | | E03C 1/262 |
| | | | | 4/287 |
| 2010/0155345 A1 * | 6/2010 | Al-Sannaa | | B01D 35/02 |
| | | | | 210/806 |
| 2011/0036763 A1 * | 2/2011 | Santinon | | B01D 35/30 |
| | | | | 210/232 |
| 2011/0126347 A1 * | 6/2011 | Qian | | E03C 1/2302 |
| | | | | 4/287 |
| 2011/0155672 A1 * | 6/2011 | McInnis | | E03F 5/04 |
| | | | | 210/166 |
| 2011/0226133 A1 * | 9/2011 | Shen | | A47J 31/005 |
| | | | | 99/316 |
| 2011/0233120 A1 * | 9/2011 | Ihler | | E03C 1/264 |
| | | | | 210/232 |
| 2012/0012510 A1 * | 1/2012 | Ventura | | E03C 1/264 |
| | | | | 210/163 |
| 2012/0145612 A1 * | 6/2012 | McInnis | | E03F 5/0404 |
| | | | | 210/163 |
| 2012/0225175 A1 * | 9/2012 | Lown | | A23F 3/18 |
| | | | | 426/435 |
| 2012/0266372 A1 * | 10/2012 | Epstein | | E03F 5/041 |
| | | | | 4/290 |
| 2012/0266982 A1 * | 10/2012 | Worth | | E03F 5/06 |
| | | | | 137/544 |
| 2012/0267296 A1 * | 10/2012 | Epstein | | C02F 1/68 |
| | | | | 210/163 |
| 2013/0087486 A1 * | 4/2013 | Epstein | | E03F 5/04 |
| | | | | 210/163 |
| 2013/0118358 A1 * | 5/2013 | Lown | | A47J 31/20 |
| | | | | 99/279 |
| 2013/0125299 A1 * | 5/2013 | Tong | | A47K 1/14 |
| | | | | 4/295 |
| 2013/0185855 A1 * | 7/2013 | Ali | | E03C 1/262 |
| | | | | 4/287 |
| 2013/0185857 A1 * | 7/2013 | Worth | | E03F 5/041 |
| | | | | 4/294 |
| 2013/0186811 A1 * | 7/2013 | Kaiser | | E03F 5/0404 |
| | | | | 210/163 |

(56) References Cited

U.S. PATENT DOCUMENTS

| | | | |
|---|---|---|---|
| 2013/0191982 A1* | 8/2013 | Booker, Jr. | E03C 1/264 4/290 |
| 2013/0240423 A1* | 9/2013 | Epstein | E03F 5/041 210/163 |
| 2013/0240424 A1* | 9/2013 | Worth | E03F 5/041 210/166 |
| 2014/0000022 A1* | 1/2014 | McLeod | E03C 1/22 4/652 |
| 2014/0054236 A1* | 2/2014 | Bennett | E03B 7/095 210/170.03 |
| 2014/0115777 A1* | 5/2014 | Schulze | E03C 1/232 4/689 |
| 2014/0173819 A1* | 6/2014 | Ali | A47K 1/14 4/287 |
| 2014/0231323 A1* | 8/2014 | Worth | C02F 1/68 210/166 |
| 2014/0238915 A1* | 8/2014 | McInnis | E03F 5/0404 210/170.03 |
| 2014/0259344 A1* | 9/2014 | Muderlak | E03D 13/007 4/256.1 |
| 2014/0310862 A1* | 10/2014 | Joseph | E03C 1/262 4/287 |
| 2015/0033459 A1* | 2/2015 | Colacino | E03C 1/26 4/287 |
| 2015/0089729 A1* | 4/2015 | Usher | E03C 1/264 4/292 |
| 2015/0259892 A1* | 9/2015 | Guterman | E03C 1/264 4/291 |
| 2015/0292191 A1* | 10/2015 | Cheng | E03C 1/264 210/153 |
| 2015/0321127 A1* | 11/2015 | Arent | E03C 1/264 210/232 |
| 2016/0040410 A1* | 2/2016 | Carpenter-Crawford | E03C 1/18 4/652 |
| 2016/0040412 A1* | 2/2016 | Fetkovich | E03C 1/264 4/292 |
| 2016/0053472 A1* | 2/2016 | Rosko | E03C 1/2302 4/292 |
| 2016/0130793 A1* | 5/2016 | Lesmeister | E03C 1/264 4/287 |
| 2016/0244955 A1* | 8/2016 | Allred, III | E03C 1/26 |
| 2016/0251839 A1* | 9/2016 | Ali | E03C 1/2302 4/287 |
| 2016/0305107 A1* | 10/2016 | Muderlak | E03C 1/264 |
| 2017/0030060 A1* | 2/2017 | Ali | E03C 1/262 |
| 2017/0073948 A1* | 3/2017 | Terrell | A47K 1/14 |
| 2017/0073949 A1* | 3/2017 | Karnegie | E03C 1/264 |
| 2017/0130435 A1* | 5/2017 | Sebolt | E03C 1/2302 |
| 2017/0218611 A1* | 8/2017 | Colacino | E03C 1/264 |
| 2017/0314244 A1* | 11/2017 | Beck | E03C 1/262 |
| 2017/0314245 A1* | 11/2017 | Beck | E03C 1/2306 |
| 2018/0106025 A1* | 4/2018 | Schuster | E03C 1/262 |
| 2018/0112381 A1* | 4/2018 | Lin | E03C 1/262 |
| 2018/0202136 A1* | 7/2018 | Karnegie | E03C 1/264 |
| 2018/0263426 A1* | 9/2018 | Ahuja | E03C 1/2306 |
| 2018/0274218 A1* | 9/2018 | Karnegie | E03C 1/262 |
| 2018/0290906 A1* | 10/2018 | Epstein | C02F 1/68 |
| 2018/0320348 A1* | 11/2018 | Schuster | E03C 1/262 |
| 2018/0320349 A1* | 11/2018 | Schuster | E03C 1/264 |
| 2018/0328015 A1* | 11/2018 | Muderlak | E03C 1/264 |
| 2019/0017255 A1* | 1/2019 | Ali | A47K 1/14 |
| 2019/0024355 A1* | 1/2019 | Sebolt | E03C 1/2302 |
| 2019/0136494 A1* | 5/2019 | Chen | E03C 1/264 |
| 2019/0218758 A1* | 7/2019 | Karnegie | E03C 1/264 |
| 2019/0271142 A1* | 9/2019 | Swart | E03C 1/264 |
| 2019/0368184 A1* | 12/2019 | Lo | E03C 1/264 |
| 2020/0080291 A1* | 3/2020 | Hsu | E03C 1/264 |
| 2020/0123749 A1* | 4/2020 | Littlejohn | E03C 1/22 |
| 2021/0095460 A1* | 4/2021 | Chaves | E03F 5/041 |
| 2021/0207356 A1* | 7/2021 | Grumbach | E03F 5/0408 |
| 2021/0277640 A1* | 9/2021 | Gwen | E03C 1/264 |
| 2022/0010536 A1* | 1/2022 | Ali | E03C 1/262 |
| 2022/0081891 A1* | 3/2022 | Chaves | E03F 5/0408 |
| 2022/0186485 A1* | 6/2022 | Grumbach | E03F 5/0408 |
| 2022/0251813 A1* | 8/2022 | Cheng | E03C 1/264 |
| 2022/0307249 A1* | 9/2022 | Tyler | E03C 1/182 |
| 2022/0341139 A1* | 10/2022 | Yazdani | E03C 1/264 |
| 2022/0349165 A1* | 11/2022 | Hazelton | B01D 29/35 |
| 2023/0018796 A1* | 1/2023 | Mayberry | E03C 1/264 |
| 2023/0358026 A1* | 11/2023 | Erickson | E03C 1/2306 |
| 2023/0392359 A1* | 12/2023 | Hillsten | E03C 1/262 |

* cited by examiner

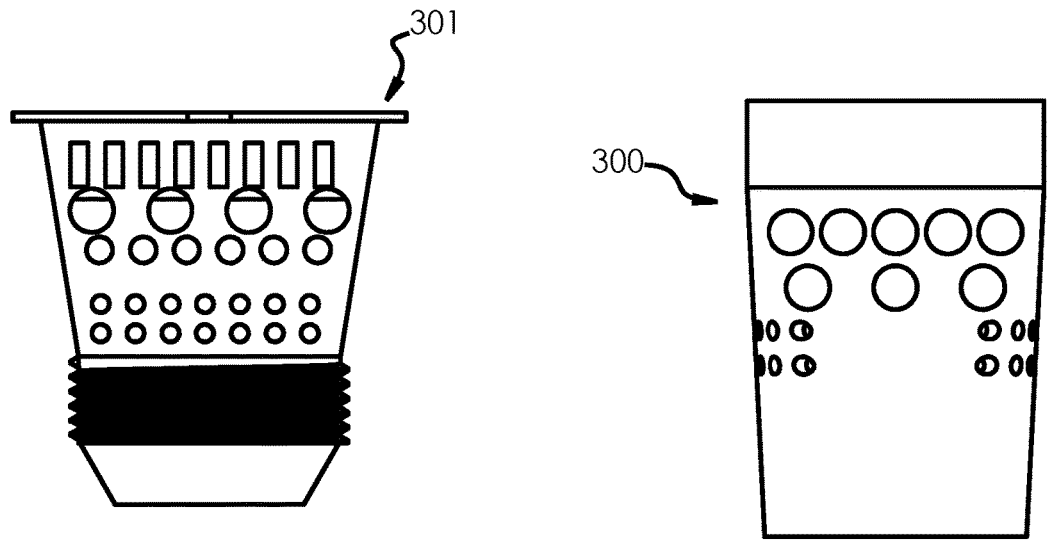
FIG. 15  FIG. 16
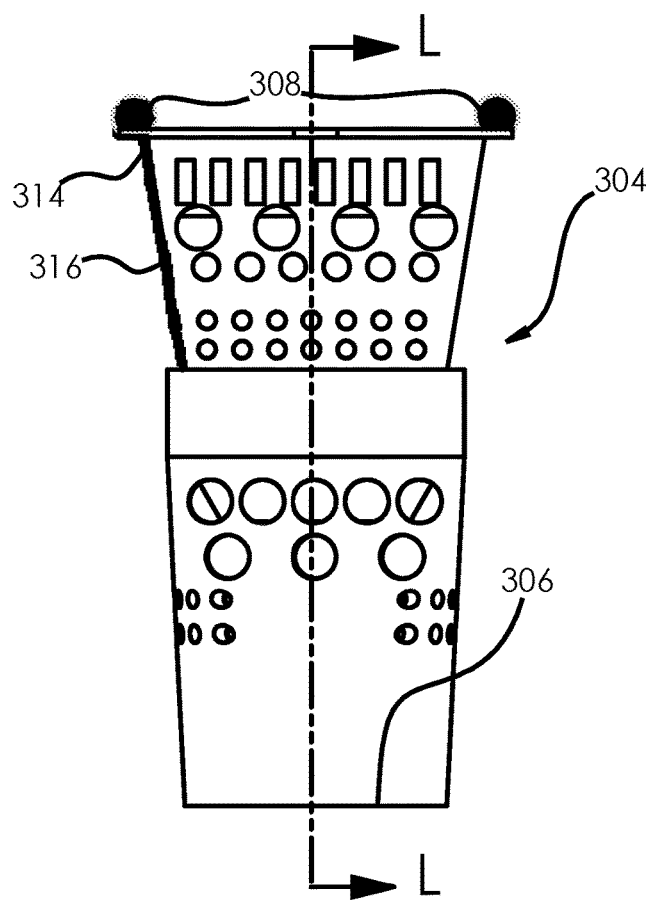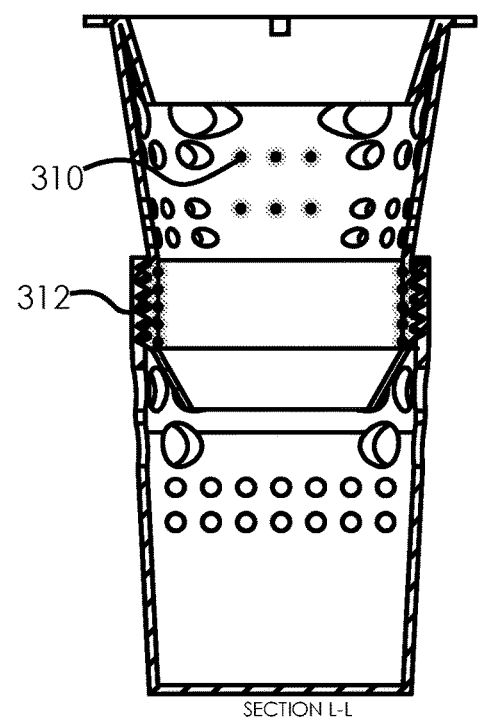
FIG. 17  FIG. 18

SYSTEM FOR CAPTURING AND DESTROYING HAIR OR WASTE WITHIN A COMMERCIAL SHOWER DRAIN

CROSS-REFERENCE TO RELATED APPLICATIONS

This application is a continuation-in-part of U.S. patent application Ser. No. 17/575,072, filed Jan. 13, 2022, pending, which is a continuation of U.S. patent application Ser. No. 17/207,803, filed Mar. 22, 2021, now U.S. Pat. No. 11,242,678, which is a continuation of U.S. patent application Ser. No. 16/996,301, filed Aug. 18, 2020, now U.S. Pat. No. 10,982,425, which a non-provisional application of U.S. Provisional Patent Application Ser. No. 62/908,626, filed Oct. 1, 2019, entitled "An apparatus for capturing and destroying hair within a shower drain", all of which are hereby incorporated by reference.

BACKGROUND

Hair and waste buildup in plumbing drains, especially shower drains, often causes clogging and water backup. Commercial shower drains-those with multiple regular users who are not themselves owners of the shower-handle significant volumes of hair and waste on a regular basis. Unclogging a commercial shower is often time consuming, expensive, disgusting, and unsafe. As hair and waste build up on the inside of a shower drain, powerful chemicals are required to break down adhered buildup. Typical industrial drain maintenance includes monitoring for clogs, manual drain "snaking", applying corrosive chemicals, or replacing some plumbing altogether. Commercial showers are unpredictable—the type of user, frequency of use, and waste generated are often a mystery. Thus, traditional commercial shower drain maintenance typically is performed reactively, rather than proactively.

SUMMARY

A system for capturing hair or waste in a plumbing drain includes a drain basket and a chemical blend. The drain basket includes an upper section including a tapered upper wall having an upper end and a lower end, and a first plurality of holes extending through the tapered upper wall, The drain basket includes a lower section having a tapered lower wall extending from the lower end of the upper section to a bottom wall, and a second plurality of holes extending through the tapered lower wall, the bottom wall extending to a bottom of the lower section, wherein the bottom wall and bottom together define a waste chamber having a volume. The chemical blend includes an active ingredient such that a specified amount of the chemical blend in an amount of water corresponding to the volume of the waste chamber provides a solution in which the active ingredient forms between 5.0% and 30.0% of the solution.

In some implementations, the tapered upper wall of the upper section further supports an upper baffle extending from an interior surface of the upper end of the tapered upper wall, the upper baffle extending along the tapered upper wall so as to cover at least some holes in the first plurality of holes, and angled inwards away from the tapered upper wall.

In some implementations, the drain basket has a top piece and a bottom piece. The top piece has a first connector extending from the lower end of the tapered upper wall. The bottom piece has a second connector extending from the upper end of the tapered lower wall and constructed and arranged to mate with the first connector to attach the top piece to the bottom piece.

In some implementations, a material forming at least a portion of the waste chamber is highly visible when the drain basket is installed in the plumbing drain.

To use such a system, the drain basket placed in the drain and the chemical blend is poured into the drain basket. The drain basket captures hair and waste that is washed down the drain. The chemical blend is poured into the drain basket to neutralize the captured hair or waste. The result is a clear drain and clear plumbing, with minimal manual labor. The drain basket does not require removal because the hair and waste are neutralized within the drain basket before a clog can develop. The chemical blend is strong enough to neutralize significant quantities of waste within minutes and is safer for both users and the plumbing systems treated than conventional drain cleaning chemicals.

The drain basket is designed to allow water to flow through the drain basket and into the drainpipes, while directing the flow of hair and waste to a designated waste chamber in the drain basket. A top section of the drain basket allows hair and waste to enter the system, while allowing water to flow down the drain and directing captured material into the waste chamber. A bottom section of the drain basket serves as the waste chamber. The drain basket can be designed to be in multiple pieces which can be connected and separated, allowing for separate manufacture or replacement.

In an example implementation described herein, the drain basket is formed of two pieces, which are connected together with a kind of connector. In this example implementation, the drain basket includes a top piece and a bottom piece. The top piece includes a tapered upper wall having an upper end and a lower end, and a first plurality of holes extending through the tapered upper wall, and a first connector extending from the lower end of the tapered upper wall. The bottom piece includes a tapered lower wall having an upper end and a lower end, and extending to a bottom wall, and a second plurality of holes extending through the tapered lower wall, the bottom wall extending to a bottom of the bottom piece, wherein the bottom wall and bottom together define a waste chamber having a volume, and a second connector extending from the upper end of the tapered lower wall and constructed and arranged to mate with the first connector to attach the top piece to the bottom piece.

In this example implementation, the bottom piece of the drain basket attaches to the top piece and serves as the waste chamber for the system. The bottom piece forms a waste chamber that collects waste and allows the waste to be neutralized and washed away. A lower baffle can be provided in the top piece to extend into the waste chamber, deterring captured waste from exiting prematurely through the drainage slots of the bottom piece. The lower section of the waste chamber includes an activation zone which contains standing water when full, and drainage slots to allow neutralized waste to flow out and down the drain.

The chemical blend is poured into the drain basket and collects in the waste chamber. In the waste chamber, the chemical blend decomposes hair or waste into a liquid state. The chemical blend includes chemicals or enzymes or both, which attack proteins and fats that make up common plumbing waste. Because the drain basket captures hair or waste, thereby reducing the amount of captured hair and waste that could stick to the inside of the pipes, the chemical blend does not need to attack chemical bonds that form between the hair or waste and the pipes. While the volume of waste and frequency of use associated with commercial drains requires powerful ingredients, the levels of such ingredients are less than conventional clog removers. Additionally, the chemical blend can incorporate enzymes that target chemical bonds in a more environmentally friendly way while still neutralizing waste efficiently.

The chemical blend includes one or more neutralizing ingredients and may include one or more additives. Example neutralizing ingredients include, but are not limited to, Sodium Hydroxide, Potassium Hydroxide, Sodium Nitrate, Keratinase, Amylase, Protease, and/or Lipase. Example additives include, but are not limited to, ingredients to thicken the blend once activated by water and ingredients which release a pleasant smell during activation. Example thickening agents include, but are not limited to, sodium carboxymethyl cellulose, xanthan gum, and sodium dodecyl sulfate. Example odor-effecting ingredients include, but are not limited to, citrus concentrates or other natural odor producing ingredients. In some implementations, the chemical blend can include sodium hydroxide. In some implementations, the chemical blend can include potassium hydroxide. In some implementations, the chemical blend can include a combination of sodium hydroxide and potassium hydroxide.

The chemical blend can be a liquid, gel, powder, or granular medium, or other medium, but the medium should allow the blend to be poured into the waste chamber through drain holes in any shower drain cover. For example, in some implementations the medium of the chemical blend is a dry powder. For example, in some implementations the medium of the chemical blend is a pourable liquid gel.

The system can be installed in the shower drain and can remain in the drain, without requiring removal of any shower drain cover to replenish the chemical blend or to clean the drain basket. If the drain basket is full of hair or waste or both, the chemical blend is applied by pouring the chemical blend through the shower drain cover. The quantity of the chemical blend applied can be modified easily through the amount poured and the amount of water allowed to flow during the neutralization process. The level of standing water in the waste chamber is calculable and along with a chosen serving size allows us to list a dissolved strength ratio.

The bottom piece of the drain basket can be disconnected and replaced in the case of a foreign object being lost down the drain or if a scheduled chemical application is missed and the waste buildup amasses. In some implementations, the drain basket can include a removal rod which extends across the upper opening of the drain basket. Such a removal rod can be used to help remove the drain basket from the drain.

The drain basket can include a feature to sense or indicate how much hair or waste is captured. One such example of this feature is the coloration of the bottom piece of the drain basket. A neon yellow coloration, for example, of the waste chamber allows plumbers or other users to see if the waste chamber is full. Another example of this feature is a sensor system which includes a set of phototransistors and/or photoresistors to detect whether the drain basket is full. A threshold can be set for the sensors so that, when enough hair or waste accumulates in the drain basket, a signal can be triggered, indicating that the chemical blend should be applied to the drain basket. The signal can be, for example, a signal activating a light emitting diode (LED) on top of the outer rim of the drain basket. An individual can determine whether to apply the chemical blend or not based on inspection of the drain basket, or a regular replacement schedule, or a triggered signal from a sensor.

BRIEF DESCRIPTION OF DRAWINGS

FIG. 15 is a side plan view of a third illustrative example of a top piece of a drain basket, shorter than the second illustrative example of FIG. 1B.

FIG. 16 is a side plan view of the first illustrative example of the bottom piece of the drain basket of FIG. 8.

FIG. 17 is a side plan view of a first example of an assembled drain basket, using the top piece of FIG. 15 and the bottom piece of FIG. 16.

FIG. 18 is a cross-section view of the assembled system of FIG. 17, along line L-L of FIG. 17.

DETAILED DESCRIPTION

A system for capturing and destroying hair or waste within a commercial shower drain or other plumbing drain includes a drain basket suspended within the drain and a chemical blend deposited in a waste chamber formed in a section of the drain basket. In the following description, various illustrative examples of constructions of a drain basket are described, various illustrative examples of compositions of a chemical blend are described.

Figure 23:
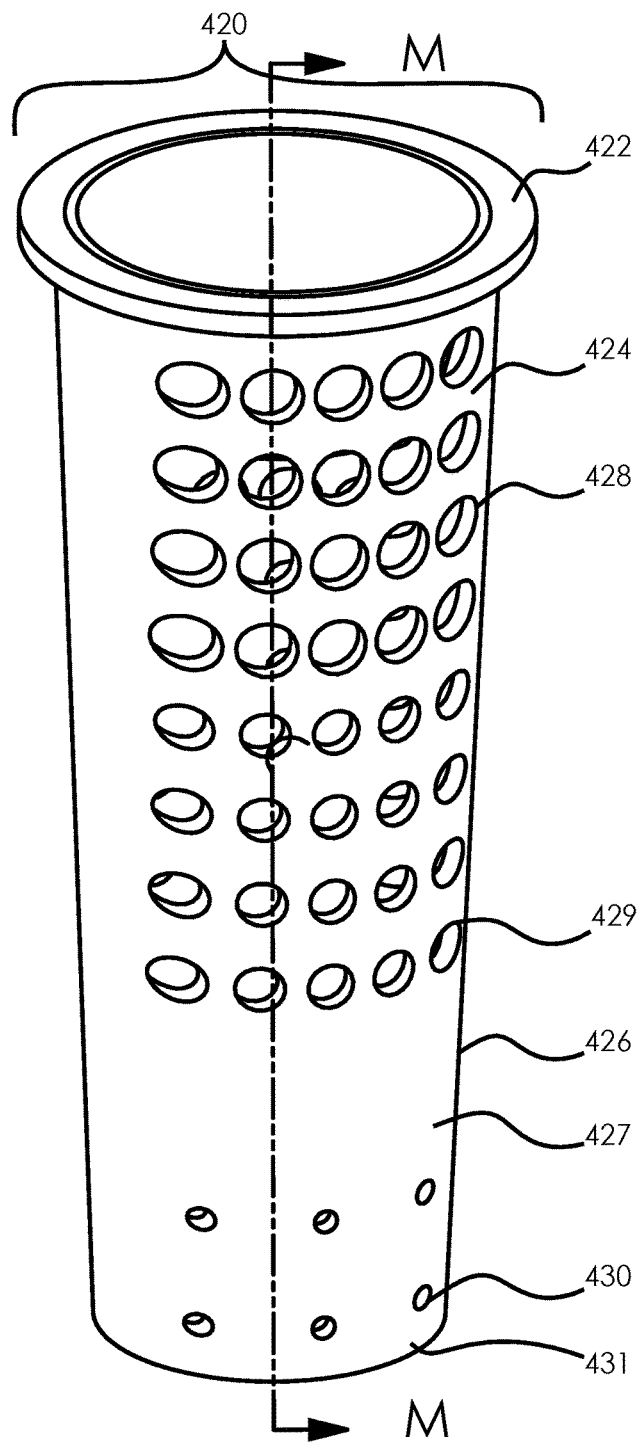
FIG. 23 is a perspective view of an illustrative example of a single-piece drain basket.
Figure 24:
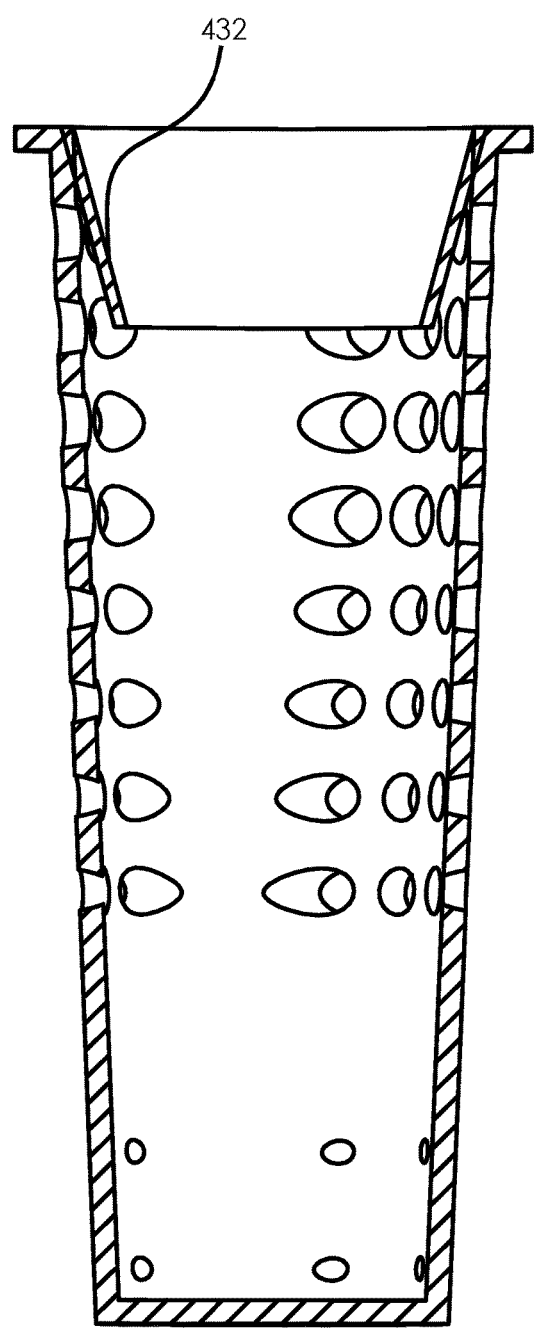
FIG. 24 is a cross-section view of the drain basket of FIG. 23, along line M-M of FIG. 23.

FIGS. 1A and 1B through FIG. 22 depict illustrative examples of constructions of a two-piece drain basket. FIGS. 23 and 24 depict illustrative examples of constructions of a single-piece drain basket.

Figure 1A:
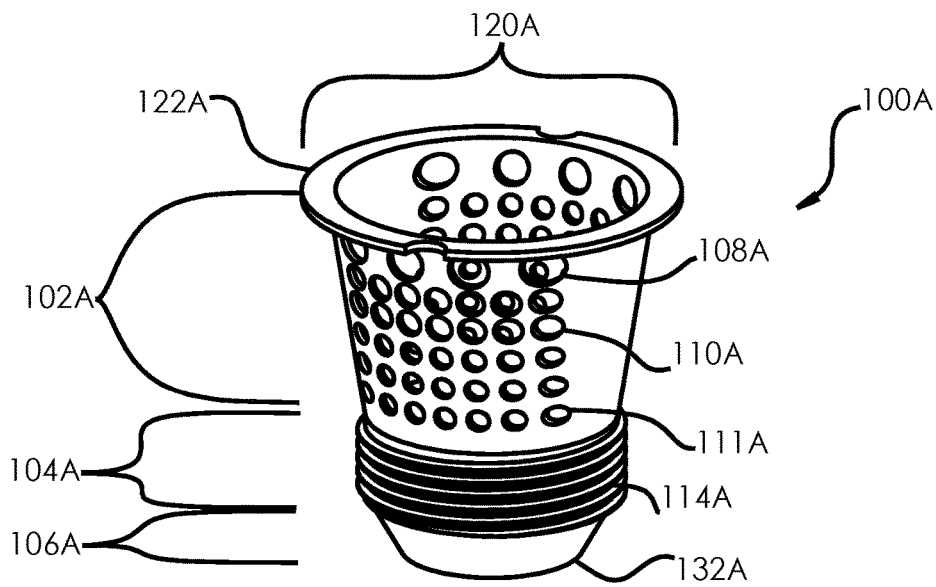
FIG. 1A is a perspective view of a first illustrative example of a top piece of a drain basket.

A first illustrative example of construction of a top piece of a drain basket will now be described in connection with FIGS. 1A through 3A. In FIG. 1A, a top piece 100A of a drain basket has an outer diameter 120A compatible with an inlet of a pipe of a plumbing drain (not shown). The top piece 100A also can have a support structure 122A, such as a lofted outer lip as shown or other extension such as hooks, which allows the top piece 100A to be supported by the inlet of the pipe.

In the top piece 100A, a tapered upper wall 102A has an upper end at the support structure 122A and a lower end at a middle section 104A. The tapered upper wall 102A allows water to flow through the drain basket while reducing the amount of hair or waste that escapes by employing one or more sets of holes in a steep wall. The one or more sets of holes can have progressively smaller diameters from an upper end of the tapered upper wall to a lower end of the tapered upper wall. In FIG. 1A, the tapered upper wall 102A has a first set of small holes 108A closer to the upper end of the tapered wall, and a second set of smaller holes 110A closer to the lower end of the tapered lower wall. In the example construction in FIG. 1A, there are multiple rows of holes in the second set of smaller holes 110A. In the example construction in FIG. 1A, another set of yet smaller holes 111A also is provided. The continuous narrowing of the inner diameter of the drain basket, from the upper end of the tapered upper wall 102A to an upper end of the middle section 104A, allows for minimal water backup and optimal draining.

In the top piece of FIG. 1A, the middle section 104A is cylindrical in shape, and additionally includes a first connector, such as threads 114A on an outer wall of the middle section 104A, to attach the top piece 100A to a bottom piece (illustrative examples of which are described below) that provides a waste chamber. The middle section 104A of the top piece 100A directs hair or waste to a bottom tapered section 106A of the top piece 100A and ultimately into a waste chamber in a bottom piece. The bottom tapered section 106A further narrows the inner diameter of the top piece 100A with a tapered wall from a lower end of the middle section 104A to the bottom 132A of the top piece. The bottom tapered section 106A is sized to fit within the waste chamber in the bottom piece.

Figures 2A, 3A:
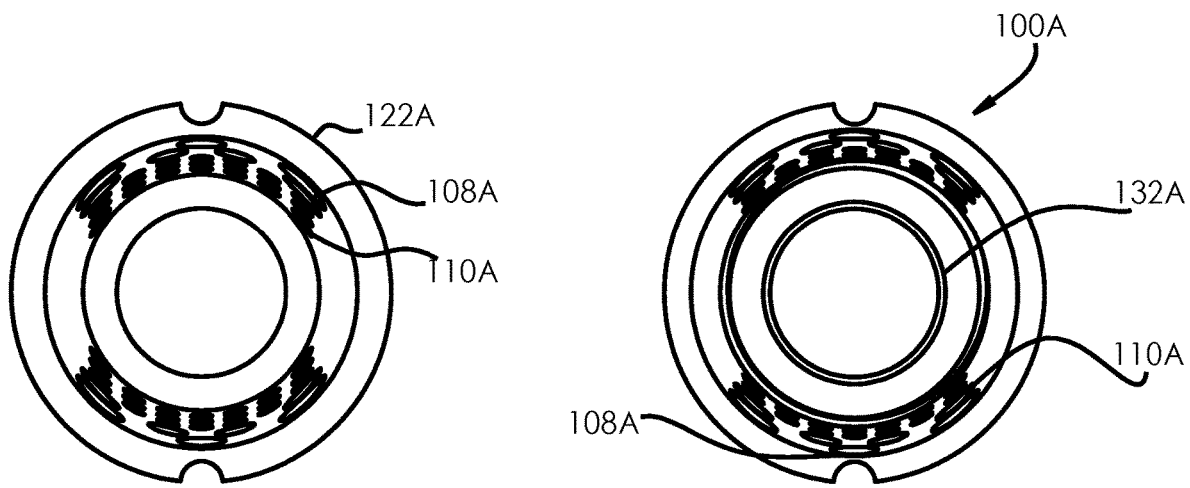
FIG. 2A is a top plan view of the top piece of the drain basket of FIG. 1A.
FIG. 3A is a bottom plan view of the top piece of the drain basket of FIG. 1A.

A top plan view of the top piece 100A is illustrated in FIG. 2A. The support structure 122A supports the drain basket on the inlet of the plumbing drain, allowing the drain basket to hang on the inlet, underneath any drain cover. Visible on the inner surface of the top piece in FIG. 2A, larger holes 108A are above the smaller holes 110A, with both formed in the tapered upper wall 102A.

A bottom plan view of the top piece 100A is illustrated in FIG. 3A. Visible on the outer surface of the top piece in FIG. 3A, narrower holes 110A are above the larger holes 108, and with both formed in the tapered upper wall 102A. As described in more detail below, the threads 114A on the outer diameter of the middle section 104A are sized to fit within matching threads on an internal diameter of a mating section of a bottom piece. The outer diameter of the bottom 132A of the top piece is smaller than an inner diameter of this mating section of the bottom piece. Thus, bottom tapered section 106A forms a kind of baffle to direct hair or waste from the bottom of the top piece into the bottom piece.

Figure 1B:
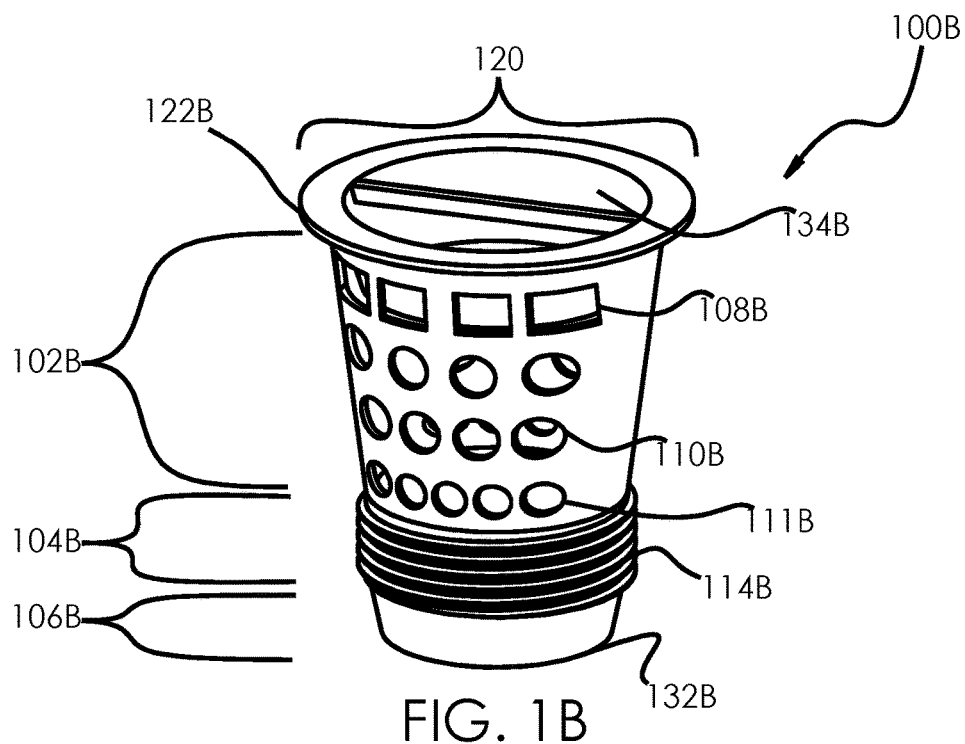
FIG. 1B is a perspective view of a second illustrative example of a top piece of a drain basket.

A second illustrative example of construction of a top piece of a drain basket will now be described in connection with FIGS. 1B through 3B. In FIG. 1B, a top piece 100B of a drain basket has an outer diameter 120B compatible with an inlet of a pipe of a plumbing drain (not shown). The top piece 100B also can have a support structure 122B, such as a lofted outer lip as shown or other extension such as hooks, which allows the top piece 100B to be supported by the inlet of the pipe.

Figure 2B:
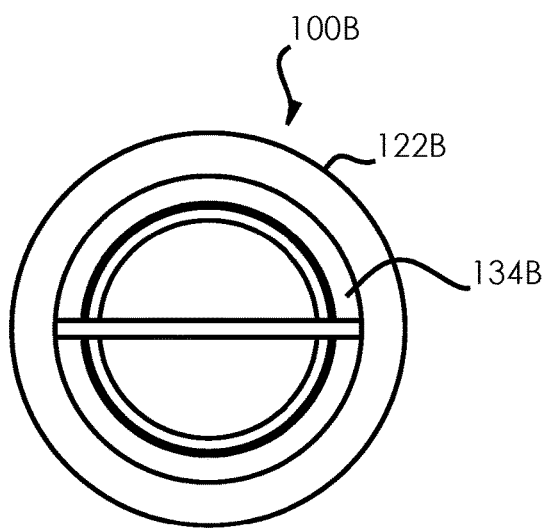
FIG. 2B is a top plan view of the top piece of the drain basket of FIG. 1B.

In the top piece 100B, a tapered upper wall 102B has an upper end at the support structure 122B and a lower end at a middle section 104B. The tapered upper wall 102B allows water to flow through the drain basket while reducing the amount of hair or waste that escapes by employing one or more sets of holes in a steep wall. The one or more sets of holes can have progressively smaller areas from an upper end of the tapered upper wall to a lower end of the tapered upper wall. In FIG. 1B, the tapered upper wall 102B has a first set of small holes 108B closer to the upper end of the tapered wall, and a second set of smaller holes 110B closer to the lower end of the tapered lower wall. In the illustration of FIG. 2B, the holes 108B are nearly rectangular in shape, due to curvature of the wall 102B.

Also, in top piece 100B is an upper baffle 134B. This upper baffle extends from an interior surface of the upper end of the tapered upper wall 102B, and covers at least some of the holes 108B. The upper baffle is angled inwards away from the tapered upper wall, toward the center of the top piece 100B. A bottom of the upper baffle 134B thus has an inner diameter smaller than the inner diameter of the tapered upper wall 102B.

In the example construction in FIG. 1B, there are multiple rows of holes in the second set of smaller holes 110B. In the example construction in FIG. 1B, another set of yet smaller holes 111B also is provided. The continuous narrowing of the inner diameter of the drain basket, from the upper end of the tapered upper wall 102B to an upper end of the middle section 104B, allows for minimal water backup and optimal draining.

In the top piece of FIG. 1B, the middle section 104B is cylindrical in shape, and additionally includes a first connector, such as threads 114B on an outer wall of the middle section 104B, to attach the top piece 100B to a bottom piece (illustrative examples of which are described below) that provides a waste chamber. The middle section 104B of the top piece 100B directs hair or waste to a bottom tapered section 106B of the top piece 100B and ultimately into a waste chamber in a bottom piece. The bottom tapered section 106B further narrows the inner diameter of the top piece 100B with a tapered wall from a lower end of the middle section 104B to the bottom 132B of the top piece. The bottom tapered section 106B is sized to fit within the waste chamber in the bottom piece.

A top plan view of the top piece 100B is illustrated in FIG. 2B. The support structure 122B supports the drain basket on the inlet of the plumbing drain, allowing the drain basket to hang on the inlet, underneath any drain cover. In FIG. 2B, the upper baffle 134B hides the holes 108B and 110B that are formed in the tapered upper wall 102B.

Figure 3B:
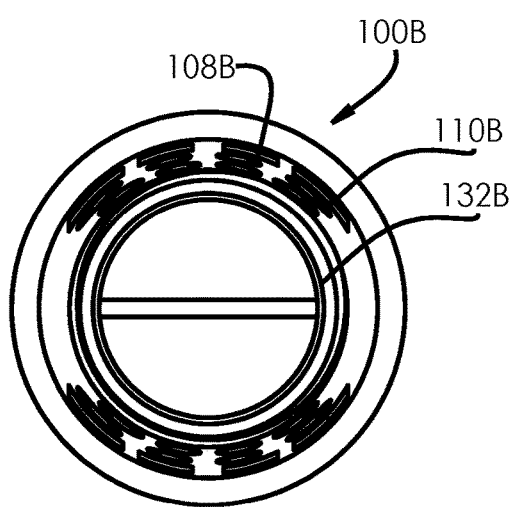
FIG. 3B is a bottom plan view of the top piece of the drain basket of FIG. 1B.

A bottom plan view of the top piece 100B is illustrated in FIG. 3B. Visible on the outer surface of the top piece in FIG. 3B, narrower holes 110B are above the larger holes 10B, and with both formed in the tapered upper wall 102B. As described in more detail below, the threads 114B on the outer diameter of the middle section 104B are sized to fit within matching threads on an internal diameter of a mating section of a bottom piece. The outer diameter of the bottom 132B of the top piece is smaller than an inner diameter of this mating section of the bottom piece. Thus, the bottom tapered section 106B forms a kind of second or lower baffle to direct hair or waste from the bottom of the top piece into the bottom piece.

Also shown in FIGS. 1B to 3B is a grip 139B, which allows for quick and efficient installation and removal or replacement of the drain basket in a drain and connection or disconnection of the top piece and the bottom piece to and from each other. The grip is shown as a bar but can be configured as desired to accommodate to different design constraints.

Figure 4:
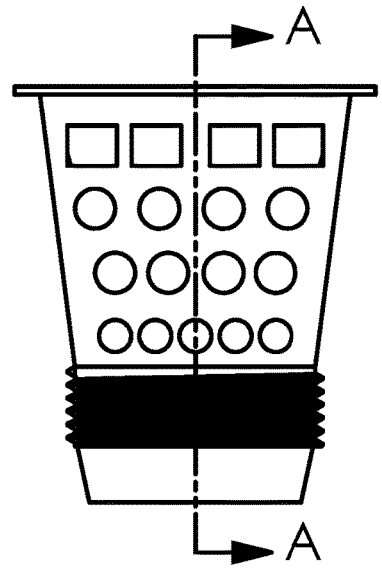
FIG. 4 is a first side plan view of the top piece of the drain basket of FIG. 1B.
Figure 5:
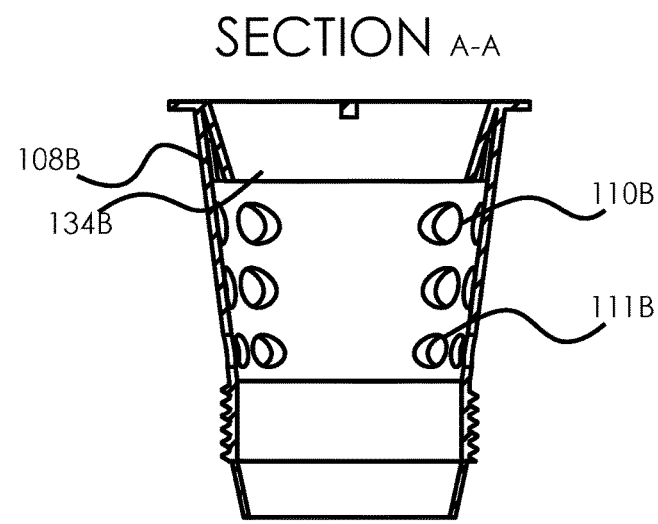
FIG. 5 is a cross-section of the side plan view of FIG. 4, along line A-A of FIG. 4.
Figure 6:
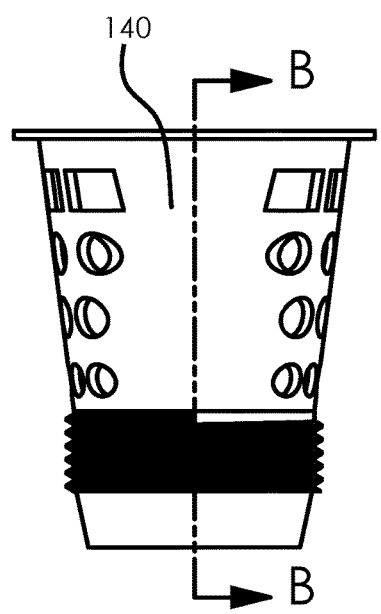
FIG. 6 is a second side plan view of the top piece of the drain basket of FIG. 1B, rotated 90 degrees from the side plan view of FIG. 4.
Figure 7:
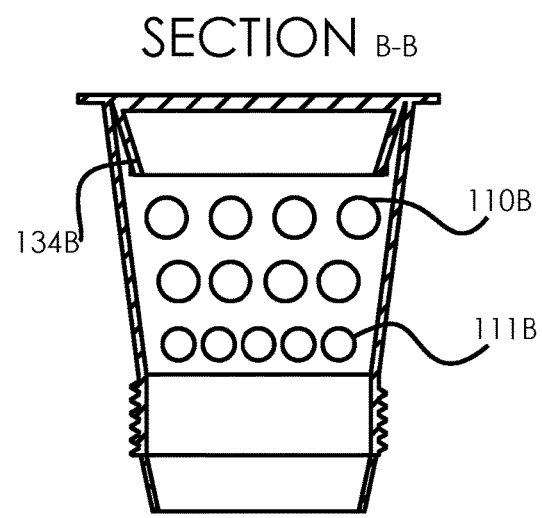
FIG. 7 is a cross-section view of the side plan view of FIG. 6, along line B-B of FIG. 6.

FIG. 4 is a first side plan view of the construction of the top piece shown in FIG. 1B. FIG. 5 is a cross-section of the side plan view of FIG. 4 along line A-A of FIG. 4. FIG. 6 is a second side plan view of the top piece of the drain basket of FIG. 1B, rotated 90 degrees from the side plan view of FIG. 4. FIG. 7 is a cross-section view of the side plan view of FIG. 6 along line B-B of FIG. 6.

As shown in FIGS. 1B, 4, and 6, the sets of holes 108B, 110B, 111B are formed in symmetrical groups along lines A-A and B-B, without entirely encircling the tapered upper wall 102B of the top piece 100B, and form a space 140 (FIG. 6) on the tapered upper wall within each set of holes. In some constructions, the sets of holes encircle the tapered upper wall at least in part. In some constructions, the sets of holes are not symmetrical. In some constructions, the sets of holes are not aligned with each other. In some constructions, the holes are formed throughout the tapered upper wall, without a prominent space 140. There is no requirement for the sets to have any regular configuration, whether within a set of holes or between sets of holes. The holes can be of any shape. The space 140 can be left without drainage holes to accommodate a sensor system, for example.

Also visible in FIGS. 5 and 7 are the upper baffle 134B. The upper baffle 134B directs hair and waste towards a bottom piece of the drain basket, by diverting the hair and waste away from drainage slots 108B and 110B. The upper baffle 134B extends a length from an upper end of the tapered upper wall and is angled inwards towards with a decreasing inner diameter narrower than the diameter of the tapered upper wall. The upper baffle 134B directs hair and waste away from holes 108B and towards a waste chamber in a bottom piece. For the same reason, the presence of the upper baffle 134B allows holes 108B to be larger than they otherwise would be.

The position of an upper baffle can depend on the size of the drain basket and its intended usage environment. For example, a baffle can be constructed on the interior opening of the upper section to direct all waste entering the drain basket towards the middle and down to the bottom of the waste chamber. The uppermost drainage holes are constructed to have the largest diameter; an upper baffle prevents waste from flowing into the drain basket and immediately out the largest drainage holes before it can be directed into the waste chamber and neutralized. Furthermore, drain baskets with high usage tend to have a large amount of collected waste; such environments preferably would use a drain basket with large drainage holes, which make it easier for waste to preemptively flow out before it can be neutralized by the chemical blend. Thus, a baffle placed in the tapered upper wall and aligned with the larger drainage holes forces waste to flow down the baffle and into the waste chamber. After waste is neutralized and water fills the drain basket, the baffle directs the waste up and out the drainage holes while preventing it from flowing back up the drain basket and out of the drain into a shower or other system.

In FIGS. 1A and B through FIG. 7, the drain basket is illustrated as having three sets of holes 108A or 108B, 110A or 110B, and 111A or 111B, in the upper section 102A, 102B of the top piece 100A, 100B. As an example construction, the holes in set 110A, 110B can be, for example about 0.25 inches in diameter, with the bottom row of holes about 1.0 inches from the bottom 132A, 132B of the top piece. One or more rows of holes can be provided. In some constructions, a bottom piece can have additional or fewer hole patterns.

Turning now to FIGS. 8 through 14, illustrative examples of constructions of a bottom piece of the drain basket will now be described.

Figure 8:
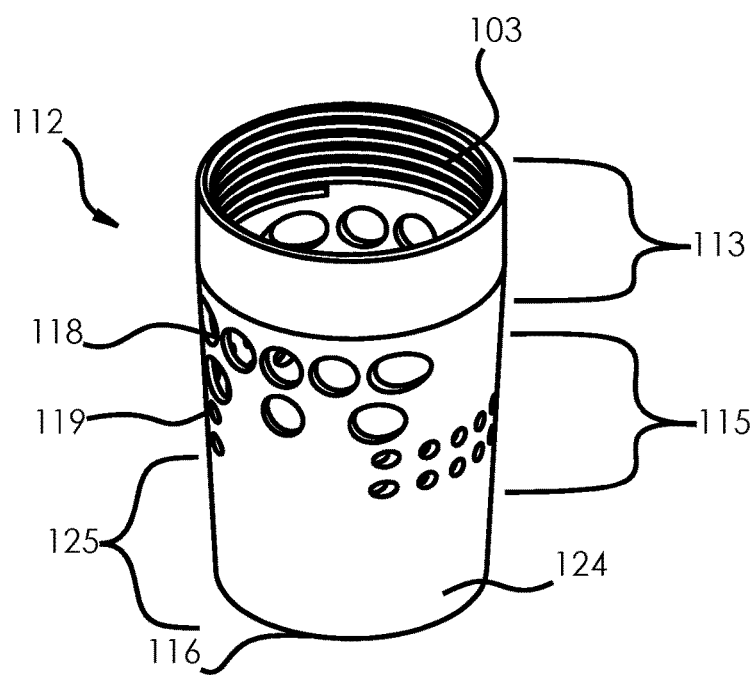
FIG. 8 is a perspective view of a first illustrative example of a bottom piece of a drain basket.

In the example construction shown in FIG. 8, a bottom piece 112 has a connector section 113, a tapered lower wall 115, and a waste chamber 124, defined by a bottom wall 125 and bottom 116.

The connector section 113 supports a second connector to attach the bottom piece 112 to a mating top piece. For example, as shown in FIG. 8, the connector section 113 is cylindrical in shape, with about the same height as the middle section 104A, 104B of a mating top piece 100A, 100B. Threads 103 on an inner wall of the connector section 113 attach the bottom piece 112 to a mating top piece, such as 100A or 100B. Threads 103 extend from an upper end to a lower end of this connector section 113, to match the threads 114A, 114B on the outer diameter of the middle section 104A, 104B of the related top piece 100A, 100B.

In FIG. 8, the tapered lower wall 115 extends from a bottom of the connector section 113 to a bottom wall 125. In FIG. 8, a set of holes 118 are formed in an upper end of the tapered lower wall 115. In FIG. 8, a set of holes 119 are formed in a lower end of the tapered lower wall 115. The bottom wall 125 extends from the lower end of the tapered lower wall, below a bottom-most set of holes to a bottom 116.

The bottom wall 125 below the bottom-most set of holes in the tapered lower wall, along with bottom 116, causes the bottom piece to define a waste chamber 124. The one or more sets of holes (e.g., 118, 119) allow excess water to flow freely out of the bottom piece, while trapping an amount of water along with hair and waste in the waste chamber 124. The water activates a chemical blend which acts on hair or waste captured in the waste chamber 124.

Figure 9:
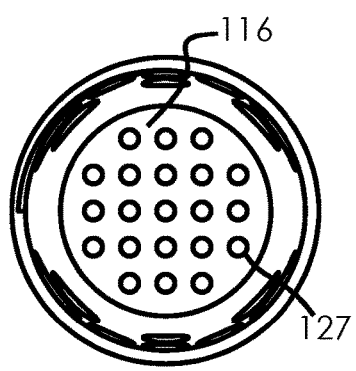
FIG. 9 is top plan view of the bottom piece of the drain basket of FIG. 8.
Figure 10:
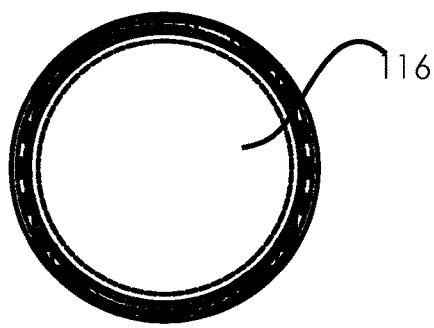
FIG. 10 is a bottom plan view of the bottom piece of the drain basket of FIG. 8.

FIG. 9 shows a bottom plan view of one illustrative example of a construction of the bottom piece shown in FIG. 8. In this example construction, the bottom 116, which forms a waste chamber 124, has holes 127. Holes 127 constructed on the bottom 116 of the drain basket are small so that they tend to become plugged by hair or waste or both, while allowing water to flow slowly upon application and activation of the chemical blend. FIG. 10 shows a bottom plan view of another example construction of the bottom piece shown in FIG. 8. In this example construction, the bottom 116 forming the waste chamber 124 does not have holes. In this example construction, water will flow out of holes 119 in the tapered lower wall 115.

Figure 11:
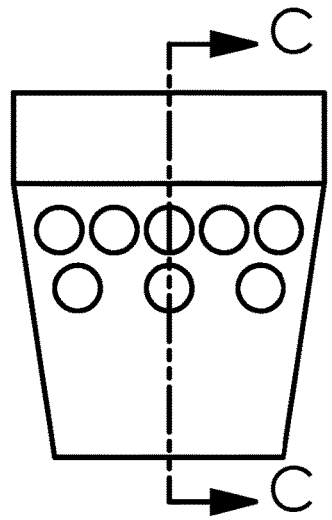
FIG. 11 is a side plan view of a second illustrative example of a bottom piece of the drain basket.
Figure 12:
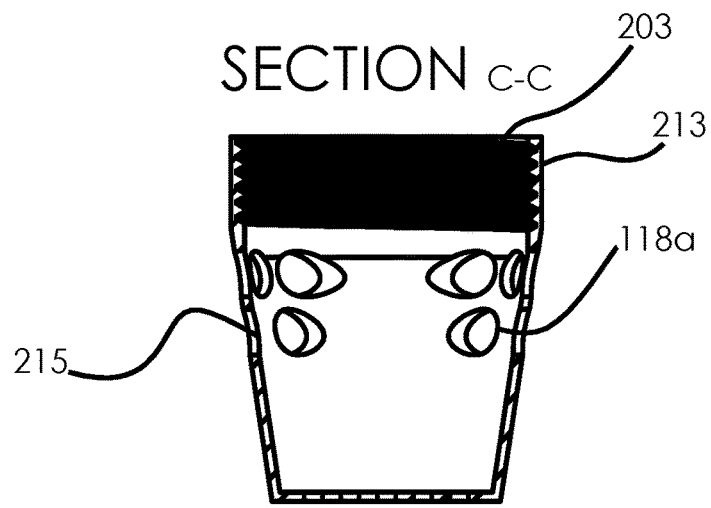
FIG. 12 is a cross-section view of the side plan view of FIG. 11, along line C-C of FIG. 11.
Figure 13:
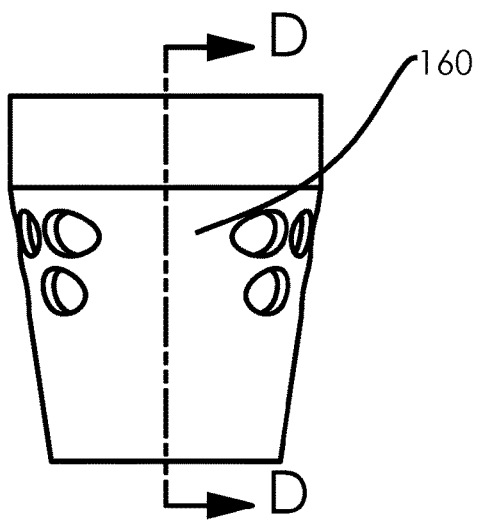
FIG. 13 is a side plan view of the second illustrative example of the bottom piece of the drain basket, rotated 90 degrees from the side plan view of FIG. 11.
Figure 14:
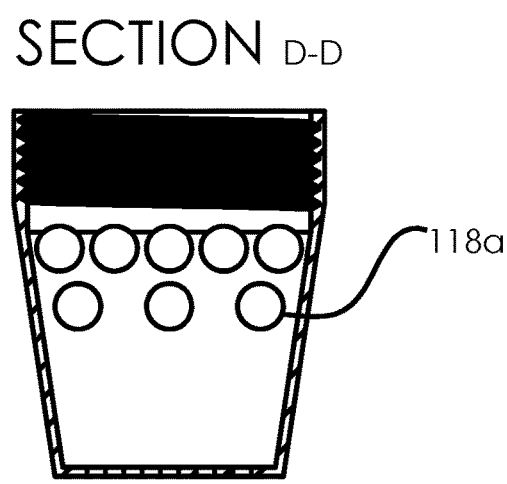
FIG. 14 is a cross-section view of the side plan view of FIG. 13, along line D-D of FIG. 13.

FIG. 11 is a side plan view of a second illustrative example of a bottom piece of the drain basket. FIG. 12 is a cross-section view of the side plan view of FIG. 11, along line C-C of FIG. 11. FIG. 13 is a side plan view of the second illustrative example of the bottom piece of the drain basket, rotated 90 degrees from the side plan view of FIG. 11. FIG. 14 is a cross-section view of the side plan view of FIG. 13, along line D-D of FIG. 13.

In FIG. 11, the bottom piece is similar to, but shorter in length than, the bottom piece shown in FIG. 8. In FIGS. 12 and 14 a connector section 213 of the bottom piece is illustrated as cylindrical in shape, and additionally includes threads 203 on an inner wall to attach the bottom piece to a mating top piece. As shown in FIGS. 11 and 13, the sets of holes 118a are formed in symmetrical groups along lines C-C and D-D, without entirely encircling the tapered lower wall 215 and form a space 160 (FIG. 13) on the tapered lower wall within each set of holes. In some constructions, the sets of holes are not symmetrical. In some constructions, the sets of holes are not aligned with each other. In some constructions, the holes are formed throughout the tapered lower wall, without a prominent space 160. There is no requirement for the sets to have any regular configuration, whether within a set of holes or between sets of holes. The holes can have any shape. The space 160 can be left without drainage holes to accommodate a sensor system, for example.

As shown in FIGS. 8 through 14, the patterns of drainage holes on the bottom piece can vary as well. For example, in FIGS. 8 through 10, the bottom piece has holes 119 at the lower end of the tapered lower wall which have an equal or smaller area than the holes 118 at the upper end of the tapered lower wall. In one implementation, such holes 118 can have a diameter of about 0.125 inches. In FIGS. 11 through 14, holes 119 are not shown and only holes 118a are used. In some constructions, the bottom piece can have additional or fewer hole patterns than shown.

Turning now to FIGS. 15 through 22, illustrative examples of an assembled drain basket will now be described.

In the example shown in FIGS. 15 through 18, a shorter version of the top piece of FIGS. 1B to 3B is shown in FIG. 15 (top piece 301), and the bottom piece of FIGS. 8 through 10 is shown in FIG. 16 (bottom piece 300).

Figure 19:
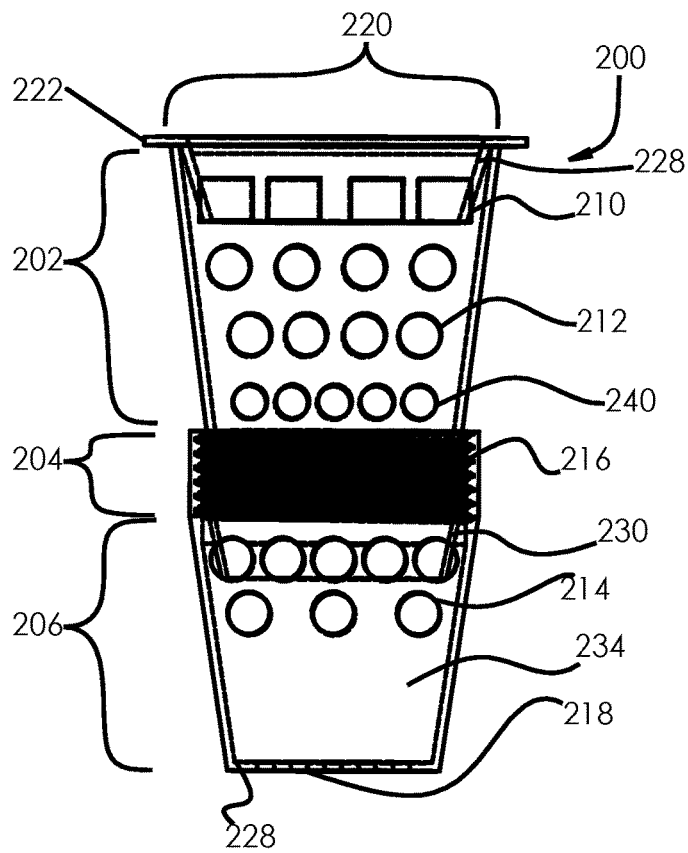
FIG. 19 is a side plan view of a second example of an assembled drain basket, using the top piece of FIG. 1B and the bottom piece of FIG. 11.
Figure 21:
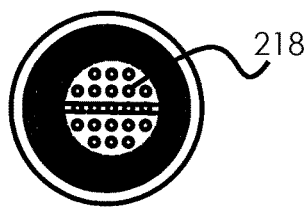
FIG. 21 is a top plan view of an illustrative example of a bottom piece of a drain basket with bottom drainage holes.

In the example shown in FIGS. 19 and 21, the top piece of FIG. 1B is shown, and the bottom piece of FIGS. 11-14 is shown.

In FIG. 19, the drain basket 200 has an outer diameter 220 compatible with a pipe of a plumbing drain. The drain basket also can have support structure 222, such as a lofted outer lip or hooks or other construction, which allows the drain basket to be supported by an inlet of the plumbing drain. A tapered upper wall 202 of a top piece of the assembled drain basket allows water to flow out of the drain basket while reducing the amount of hair or waste that escapes, by employing a first set of holes 210 in steep walls. The tapered upper wall 202 also may have holes 212 different from holes 210, and optionally holes 240 different from both holes 210 and 212.

A middle section 204 of the assembled drain basket is where the top piece connects to the bottom piece. While the connection of the top piece to the bottom piece is illustrated as threading, any kind of attachment mechanism can be used. Generally, the top piece includes a first connector, and the bottom piece includes a second connector. The first and second connectors are constructed and arranged to have mechanically mating connection that can allow the pieces to be connected to each other and disconnected from each other. Threading or snap-fit constructions are examples of such connectors.

A tapered lower wall 206 in the bottom piece directs hair or waste to the waste chamber 234. The tapered lower wall 206 has a first set of holes 214, and optionally a second set of smaller holes 218 in the bottom 228 of the waste chamber. A view of these smaller holes 218 is shown in a top view of the drain basket assembly shown in FIG. 21.

The continuous narrowing of the inner diameter of the drain basket from the top piece to the bottom piece, allows for minimal water backup and optimal draining. The chemical blend is placed in the waste chamber 234, supported by the bottom 228 of the drain basket. The set of holes 214 nearest the top of the waste chamber allows excess water to flow freely out of the drain basket while trapping a specific amount of water to activate the chemical blend which acts on hair or waste captured in the waste chamber 234.

Figure 20:
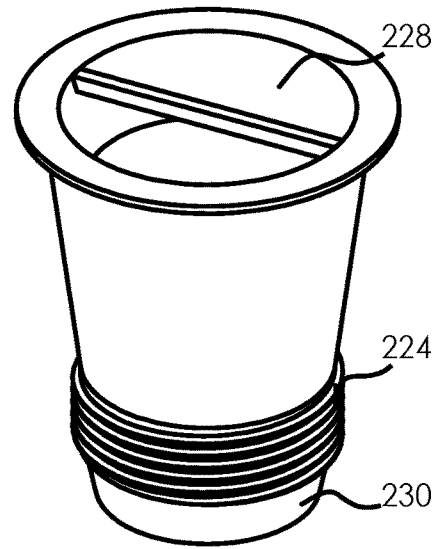
FIG. 20 is a perspective view of an illustrative example of a top piece of the drain basket, similar to FIG. 1B, without drainage holes.
Figure 22:
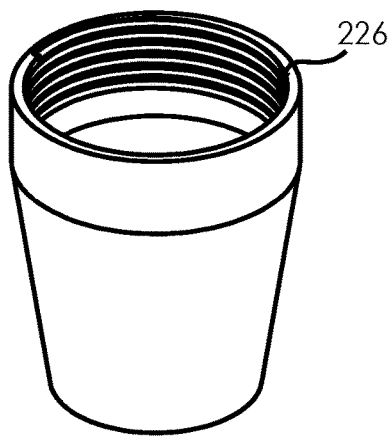
FIG. 22 is a perspective view of an illustrative example of a bottom piece of the drain basket, similar to FIG. 11, without drainage holes.

Turning now to FIGS. 20 and 22, an illustrative example of a two-piece drain basket will now be described to highlight the use of baffles as an example construction. FIGS. 20 and 22 do not illustrate any particular hole patterns, since any of a variety of hole patterns can be used. Generally, holes in the top piece are more numerous and larger than holes at the top of the waste chamber in the bottom piece. FIG. 20 depicts a possible construction of a top piece of a drain basket and FIG. 22 depicts a possible construction of bottom piece of the drain basket that forms its waste chamber. Inner thread 224 and outer thread 226 depict the separation of a connected assembly (e.g., 200 in FIG. 19). It should be noted that another possible construction for threading includes outer threads on the top of the bottom piece and inner threads on the bottom of the top piece. In the top piece, an upper baffle 228 (see also FIG. 19) in the top piece directs hair and waste towards the bottom of the drain basket and away from drainage slots at the top of the top piece (see 210 in FIG. 19). The lower baffle 230 (see also FIG. 19) at the bottom of the top piece fits within the diameter of the bottom piece. The lower baffle 230 directs hair and waste towards the waste chamber and away from drainage holes at the top of the bottom piece (see 214 in FIG. 19).

Referring again to FIGS. 15 through 18, there are several ways for the system to alert a user when application of the chemical blend becomes ideal. FIG. 15 shows a top piece 301 of a slightly smaller construction than the top piece shown in FIGS. 1B to 3B, FIGS. 4 through 7 and 19 through 20. FIG. 16 is an example bottom piece 300, similar in construction to FIGS. 8 through 10.

In one example construction, the bottom section is constructed of a material easily visible in dim conditions, such as a neon yellow material. Yellow is the most visible color to the human eye in the darkness; red and orange hues are more easily visible during the daytime. Some example hues for the coloration of the waste chamber include, but are not limited to: fluorescent green-yellow, fluorescent orange-red, or neon yellow. The waste chamber also can be constructed out of plastic that contains phosphors, such as Strontium Aluminate, which make it glow in the dark. The choice of color does not affect the functionality of the drain basket and should be chosen to provide maximum visibility through any cover of the drain in which the drain basket is placed. Thus, the bottom section can be constructed from a different material than the top section, so that when it fills to capacity it is no longer visible through the drain cover and the user knows it is the ideal time for chemical application.

In another example construction, as shown in FIGS. 17 and 18, the drain basket 304 can include a sensor system. The sensor system can include, for example, a set of phototransistors 310, or photoresistors 312, or both, using infrared light to sense whether the drain basket is full. These can be placed at or just above the holes just above the waste chamber. A small battery, similar to batteries used in a watch or a smoke detector, can be used to power the sensor system, and can be attached near the top and on the outside of the drain basket (e.g., at 314). The battery can employ an indication system similar to a common smoke detector. Wiring 316 and a small custom circuit board (not shown) allow diverse programming options, such as Internet connectivity and computer learning. A threshold can be set for the sensors so that, when enough hair or waste accumulates in the drain basket, a signal can be triggered, indicating that some amount of chemical blend should be placed in the drain basket. The signal can be, for example, a signal activating at least one light emitting diode (LED) 308 on top of the outer rim of the drain basket. There may be two LED's, e.g., one green (signifying adequate operation) and one red (signifying time for replacement). An individual can determine whether to apply the chemical blend or not based on inspection of the drain basket, or a regular replacement schedule, or a triggered signal from a sensor.

In some implementations, the drain basket can be formed of a single piece. FIG. 23 is a perspective view of an illustrative example of a single-piece drain basket. FIG. 24 is a cross-section view of the drain basket of FIG. 23, along line M-M of FIG. 23.

In FIG. 23, the drain basket has an outer diameter 420 compatible with an inlet of a pipe of a plumbing drain (not shown). The drain basket also can have a support structure 422, such as a lofted outer lip as shown or other extension such as hooks. A tapered wall 424 has an upper end at the support structure 422 and a lower end the waste chamber 426. The tapered wall allows water to flow through the drain basket while reducing the amount of hair or waste that escapes by employing one or more sets of holes in a steep wall. The one or more sets of holes can have progressively smaller diameters from an upper end of the tapered wall to a lower end of the tapered wall. In FIG. 23, the tapered wall has a first set of holes 428 closer to the upper end of the tapered wall, and a second set of smaller holes 429 closer to the lower end of the tapered wall. The continuous narrowing of the inner diameter of the drain basket allows for minimal water backup and optimal draining. The drain basket also includes an upper baffle 432 (FIG. 24). This upper baffle extends from an interior surface of the upper end of the tapered wall, and covers at least some of the holes 428. The upper baffle is angled inwards away from the tapered wall, toward the center of the drain basket. A bottom of the upper baffle 432 thus has an inner diameter smaller than the inner diameter of the tapered wall 424. From a lower end of the tapered wall 424, a bottom wall 426 extends to a bottom 431. The bottom wall 426 along with bottom 431 defines a waste chamber 427. Optionally, one or more sets of small holes 430 can allow excess water to flow freely out of the waste chamber, while still trapping an amount of water along with hair and waste in the waste chamber.

From the foregoing it should be understood that the drain basket can have various constructions with various dimensions. For example, the drain basket can be constructed either as a single piece or in multiple pieces. Whether the drain basket assembly is constructed of one piece or multiple pieces has limited effect on the functionality of the invention. However, a multiple piece design allows for differentiation in color, easier production, and as a failsafe. Should the user not want to use the chemical blend, they can remove the drain basket, disconnect and replace the waste chamber, and replace the drain basket back into the drainpipe for continued use.

If the drain basket is two or more parts, the individual parts are assembled to create the drain basket system. One such example of a multiple piece construction is shown by the top pieces shown in FIG. 1 through FIG. 7 or in FIG. 15, and bottom pieces shown in FIGS. 8-10 and 16, or FIGS. 11-14. As the illustrative examples show, the bottom piece with the waste chamber can have threads which are designed to engage threads on the top piece. As an example construction, threads on the top piece can have an outer diameter of 1.55 inches and threads on the bottom piece can have an inner diameter of 1.575 inches.

The drain basket can be constructed using durable plastics or stainless steel. In one example implementation, the drain basket can be constructed using additive manufacturing, or 3D printing, technologies. Such a construction of the drain basket allows it to withstand hundreds of uses without decomposing. The drain basket, once constructed, is installed simply by removing the drain cover and placing the drain basket snugly into the drain mouth, for which a standard inner diameter is about 2.0 inches in the United States. After re-installing the drain cover, the drain basket installation is complete.

In one example construction, the drain basket can have a 1.95 inches, universally-compatible, outer diameter, along with a lofted 2.2 inches, universally-compatible, outer lip, which allows the drain basket to snugly fit shower drains compliant with plumbing regulations used in the United States. The top piece 100 of the drain basket can be, for example, approximately 3.25 inches long from support structures 122 to the bottom 132.

The top piece, with an upper section that starts with the largest possible inner diameter given the size of the drainpipe and the thickness of the material, allows for maximum water flow, without allowing hair or waste to escape, by employing a system of holes with progressively smaller diameters, starting at about 0.25 inches. The middle section of the top piece directs hair to the waste chamber, without allowing any waste to escape or water to backup into the shower. Finally, the bottom piece, above the waste chamber, employs a system of holes to carefully keep a desired level of standing water while flowing out excess water.

Further, while the uppermost diameter often will remain between 1.75 and 2.00 inches, there are many features which can be easily adjusted to fit the needs of various shower drains. For example, features which can be adjusted to ensure maximum efficiency include: height of the drain basket, height of the waste chamber, height of the assembled drain basket, diameter of drainage holes, diameter of baffles, angle of loft, number of pieces when dissembled, and diameter of the upper fastening lip. While this list is not exhaustive, it should illustrate the fact that this system can be customized to most appropriately tackle a given shower drain without losing overall functionality.

The aforementioned adjustments can be made to best fit the specific environment of the system based on the number of shower users and the demographics of said users. For example, a single university shower is often used by more than six individuals, twice a day each for a thorough cleaning. Gymnasium showers are often used at a rate of four individuals per day, although gymnasium shower users often wash quickly and without many products. Finally, a hotel shower is often used by two people, once a day for a thorough cleaning. Thus, dormitory showers require a larger volume waste chamber than do gymnasium showers and hotel showers, respectively. In addition to the volume of the waste chamber, showers with more frequent and thorough use require larger diameter drainage holes. The pattern of, diameter of, and quantity of drainage holes can all be adjusted to best fit a system's environment.

Turning now to the chemical blend, The chemical blend and the drain basket work in a symbiotic relationship. The drain basket allows the blend to activate in a small, targeted area of waste collection. Furthermore, the chemical installation is as simple as pouring it through a drain cover each time the bottom of the drain basket fills with hair. The medium of the chemical blend can be formed or sized to fit holes in the drain cover, allowing the chemical blend to be dropped into the drain basket through the drain cover.

the chemical blend is deposited into the waste chamber after the drain basket is installed in a shower drain. In the waste chamber, the chemical blend decomposes hair or waste into a liquid state. The chemical blend includes chemicals, enzymes, or both, which attack proteins and fats that make up common plumbing waste. Because the drain basket captures hair or waste, thereby reducing the amount of hair or waste that could stick to the inside of pipes, the chemical blend does not need to attack chemical bonds that form between the hair or waste and the pipes. While the volume of waste and frequency of use associated with commercial drains requires powerful ingredients, the levels of such ingredients are less than conventional clog removers. Additionally, the chemical blend can incorporate enzymes that target chemical bonds in a more environmentally friendly way while still neutralizing waste efficiently.

The chemical blend includes an active ingredient such that a specified amount of the chemical blend in an amount of water corresponding to the volume of the waste chamber provides a solution in which the active ingredient forms between 5.0% and 30.0% of the solution.

Some examples of chemical blends include but are not limited to blends with an active ingredient of sodium hydroxide, potassium hydroxide, or a combination of sodium hydroxide and potassium hydroxide, or any other caustic active ingredient. In these examples, the active ingredient is a caustic active ingredient. Such a caustic active ingredient can be combined with any one or more of sodium thioglycolate, sodium tripolyphosphate, keratinase, amylase, lipase, or sodium carboxymethyl cellulose.

The chemical blend is made from a combination one or more of the following ingredients:
1. A caustic active ingredient,
2. A surfactant, which decreases surface tension and foaming and help with the mixing of solutions,
3. A depilatory agent,
4. A targeted combination of enzymes, and
5. A water-soluble thickener.

The chemical blend generally includes at least the caustic active ingredient. The surfactant and the depilatory agent generally are used together, and are combined with the caustic active ingredient when used. Similarly, one or more enzymes generally are used together, and are combined with at least a caustic active ingredient when used. A combination of enzymes, surfactant, and depilatory agent also generally would be used in combination with the primary caustic active ingredient. A water-soluble thickener or other agent can be used with any of these formulations to put the blend into a desired form, such as a powder, gel, or liquid.

For specific examples of combinations of ingredients are provided below. In the examples below the percentage range of content of each ingredient is based on a dissolved weight per volume. The amount of chemical blend to be dissolved depends on its medium: powder blends will be weighed and dissolved in a calculated volume of solvent; liquid blends will be weighed and dissolved before application. As an example, formulations of the chemical blend, a suitable mixture can include:
1. Active ingredient: 5%-30%
    a. Sodium Hydroxide (aka lye or caustic soda): 5% to 30%
    b. Potassium hydroxide (aka caustic potash): 5% to 30%
2. Surfactant: 0%-5%
    a. Sodium dodecyl sulfate
    b. TERGITOL-brand surfactant, or other secondary alcohol ethoxylate, nonionic surfactant.
    c. Sodium tripolyphosphate:
    d. Sodium silicate: more ecofriendly
    e. sodium hypochlorite (bleach)
3. Depilatory Agent: 0%-10%
    a. Sodium Thioglycolate: 1%-10%
4. Enzyme blend: 0%-10%
    a. Keratinase: 1% to 5%
    b. Amylase: 1% to 5%
    c. Lipase: 1% to 5%
    d. Trypsin: 1%-5%
5. Thickener: 0%-10%
    a. Xanthan Gum
    b. Sodium carboxymethyl cellulose
    c. Sodium lauryl sulfoacetate
    d. Stearic acid
    e. Lauric acid
    f. Sodium lauryl ether sulfate In some implementations, the chemical blend is a non-acidic blend which generally is safer for users and pipes than acidic blends. In the examples above, the chemical blend has an active ingredient which is caustic. In some non-commercial uses, a mix of baking soda and vinegar may be adequate.

The chemical blend is less corrosive on plumbing fixtures and less caustic to human skin than traditionally available commercial-grade drain cleaners. Because the drain basket reduces the amount of hair or waste that could adhere to the drainpipe itself, the chemical blend can be safer on skin and plumbing while still effective in dissolving hair, grease, soap, and other organic matter caught in the waste chamber.

The chemical blend can exist as a powder, a water-based solution, and a water-based solution with an additive thickening agent. Depending on a given shower's volume of use, the medium of the chemical blend can be selected to optimize efficiency. Further, the proportions of the chemical blend can be altered to strengthen or weaken the blend. This is most easily done by manipulating the proportion of the pH adjusting agent Increasing the pH of the chemical reaction allows the chemical blend to work more quickly and dissolve greater amounts of captured waste. Decreasing the pH of the chemical reaction reduces the efficiency of the chemical blend and prevents the blend from neutralizing severe waste buildups.

A caustic active ingredient is the primary chemical in the chemical blend. The active ingredient increases the alkalinity of the solution, improving the breakdown of oil and grease, and softening the water. Possible caustic active ingredients in the chemical blend include sodium hydroxide, potassium hydroxide, and sodium silicate. The active ingredient is included as a range, from 5%-30% of the blend.

A surfactant can be included in the chemical blend. The surfactant or surfactants act as emulsifiers, aiding in the interaction between the liquid chemical blend and the trapped hair and waste. The surfactant improves the chemical blend's ability to engage with captured waste while also elongating the interaction between the blend and the waste. It does this through "softening" the water or making it easier for a water based chemical blend to interact with soil, oils, and captured organic waste. There are several surfactants that can be included in the chemical blend, including sodium tripolyphosphate, TERGITOL-brand surfactant (or similar) and sodium dodecyl sulfate. Surfactants are included as a range, from 1%-5%, of the blend.

A depilatory agent can be included to assist with the dissolution of captured hair. Thioglycolic salts, specifically sodium thioglycolate, are the most used depilatory agents. The depilatory agent is included as a range, from 1%-10%, of the blend.

A targeted combination of enzymes can be included in the chemical blend. The function of the enzyme is to target and dissolve a specific aspect of the organic matter captured in the waste chamber. These aspects include proteins, starches, and fats. One possible combination of enzymes is keratinase, amylase, and protease. These enzymes target hair, starches, and fats, respectively. Keratinase is a proteolytic enzyme that digests keratin, the main component of hair. Amylase acts on starch, breaking it down into smaller carbohydrate molecules. Protease is a proteolytic that breaks down proteins into smaller amino acids. Together, the enzymatic ingredients act to break down the captured hair and waste into the smallest possible components and ensure that hair and waste is dissolved thoroughly enough to wash out the waste chamber and down the drain safely. The aforementioned enzymes are each included in a range from 0.1%-5%, with the total proportion of included enzymes not exceeding 10% of the total blend.

A water-soluble thickener can be included in the chemical blend. The function of the thickening agent is to ensure that the chemical blend, once poured into the waste chamber, can remain in the bottom waste chamber long enough to effectively neutralize the captured hair and waste. Without a thickener, it is possible for running water to force the chemical blend out of the waste chamber and down the drain before it has time to fully dissolve captured hair and waste. It is imperative that the thickening agent is incorporated with the correct proportion, as a blend too thick will not allow the ingredients to interact with the waste. Examples of a thickening agent include but are not limited to: xanthan gum, sodium carboxymethyl cellulose, and sodium dodecyl sulfate. Any thickening ingredient should be incorporated in an amount ranging from 0.1%-10% of the blend, with the ideal value not to exceed 5%.

The chemical blend should be comprised of ingredients from the aforementioned list that first maximize efficiency, then best maximize safety. The chemical blend, formulated at its most basic level, includes either sodium hydroxide or potassium hydroxide. While both ingredients are caustic, it is possible to incorporate them into the chemical blend in significantly less amounts than existing drain cleaning products. This is due to the symbiotic relationship between the drain basket and the chemical blend; the drain basket captures hair and waste away from the drainage pipe and thus requires less energy to dissolve and wash safely down the drainpipe. The chemical blend can be formulated with additional ingredients for several purposes. These purposes include, but are not limited to strengthening, fragrance adjusting, density adjusting, and medium adjusting. Using the three previously mentioned environments as an example, the composition of the chemical blend could be altered to individually maximize its overall success in dormitories, gymnasiums, and hotels. The incorporation of a surfactant, depilatory agent, or enzyme blend allows the blend to include lower quantities of the builder. Higher volumes of shower use and resulting captured waste requires higher levels of the builder to neutralize such quantities of waste quickly and effectively. Lower volumes of shower use and resulting captured waste allow the blend to incorporate higher levels of the additional ingredients. Showers with more than ten uses per day, such as dormitory showers, require higher levels of the active ingredient than hotel showers with an average of two to four uses per day, or an everyday homeowner's shower. Thus, professional plumbers and homeowners can best neutralize their respective quantities of waste, each with the safest, most efficient blend possible.

The preferred compositions contain sodium tripolyphosphate as the surfactant, sodium hydroxide as the builder, sodium thioglycolate as the depilatory agent, a combination of keratinase, amylase, and lipase as the enzyme blend, sodium carboxymethyl cellulose as the thickener.

With the diverse types of chemical blends and drain basket constructions a kit can be provided with one or more different top pieces and one or more different bottom pieces. Some kits further can include one or more different chemical blends. Such kits allow adaptation to different usage levels for a drain. If a drain is heavily used, then a bottom piece with a large waste chamber can be used with a stronger chemical blend. If a drain is lightly used, a weaker chemical blend may be used, or a bottom piece with a smaller waste chamber can be used, or both.

Accordingly, in one aspect, a drain basket for capturing hair or waste in a plumbing drain includes an upper section including a tapered upper wall having an upper end and a lower end, and a first plurality of holes extending through the tapered upper wall, the tapered upper wall further supporting an upper baffle extending from an interior surface of the upper end of the tapered upper wall, the upper baffle extending along the tapered upper wall so as to cover at least some holes in the first plurality of holes, and wherein the upper baffle is angled inwards away from the tapered upper wall. The drain basket includes a lower section having a tapered lower wall extending from the lower end of the upper section to a bottom wall, and a second plurality of holes extending through the tapered lower wall, the bottom wall extending to a bottom of the lower section, wherein the bottom wall and bottom together define a waste chamber having a volume.

In one aspect, a drain basket for capturing hair or waste in a plumbing drain includes a top piece and a bottom piece. The top piece includes a tapered upper wall having an upper end and a lower end, and a first plurality of holes extending through the tapered upper wall, and a first connector extending from the lower end of the tapered upper wall. The bottom piece includes a tapered lower wall having an upper end and a lower end, and extending to a bottom wall, and a second plurality of holes extending through the tapered lower wall, the bottom wall extending to a bottom of the bottom piece, wherein the bottom wall and bottom together define a waste chamber having a volume, and a second connector extending from the upper end of the tapered lower wall and constructed and arranged to mate with the first connector to attach the top piece to the bottom piece.

In one aspect, a drain basket for capturing hair or waste in a plumbing drain includes an upper section including a tapered upper wall having an upper end and a lower end, and a first plurality of holes extending through the tapered upper wall. The drain basket includes a lower section having a tapered lower wall extending from the lower end of the upper section to a bottom wall, and a second plurality of holes extending through the tapered lower wall, the bottom wall extending to a bottom of the lower section, wherein the bottom wall and bottom together define a waste chamber having a volume, wherein a material forming at least a portion of the waste chamber is highly visible when the drain basket is installed in the plumbing drain.

In one aspect, a system for capturing hair or waste in a plumbing drain includes a drain basket and a chemical blend. The drain basket includes an upper section including a tapered upper wall having an upper end and a lower end, and a first plurality of holes extending through the tapered upper wall, the tapered upper wall further supporting an upper baffle extending from an interior surface of the upper end of the tapered upper wall, the upper baffle extending along the tapered upper wall so as to cover at least some holes in the first plurality of holes, and angled inwards away from the tapered upper wall. The drain basket includes a lower section having a tapered lower wall extending from the lower end of the upper section to a bottom wall, and a second plurality of holes extending through the tapered lower wall, the bottom wall extending to a bottom of the lower section, wherein the bottom wall and bottom together define a waste chamber having a volume. The chemical blend includes an active ingredient such that a specified amount of the chemical blend in an amount of water corresponding to the volume of the waste chamber provides a solution in which the active ingredient forms between 5.0% and 30.0% of the solution.

In one aspect, a system for capturing hair or waste in a plumbing drain includes a drain basket and a chemical blend. The drain basket includes a top piece and a bottom piece. The top piece of the drain basket includes a tapered upper wall having an upper end and a lower end, and a first plurality of holes extending through the tapered upper wall, and a first connector extending from the lower end of the tapered upper wall. The bottom piece of the drain basket includes a tapered lower wall having an upper end and a lower end, and extending to a bottom wall, and a second plurality of holes extending through the tapered lower wall, the bottom wall extending to a bottom of the bottom piece, wherein the bottom wall and bottom together define a waste chamber having a volume, and a second connector extending from the upper end of the tapered lower wall and constructed and arranged to mate with the first connector to attach the top piece to the bottom piece. The chemical blend includes an active ingredient such that a specified amount of the chemical blend in an amount of water corresponding to the volume of the waste chamber provides a solution in which the active ingredient forms between 5.0% and 30.0% of the solution.

In one aspect, a system for capturing hair or waste in a plumbing drain includes a drain basket and a chemical blend. The drain basket includes an upper section including a tapered upper wall having an upper end and a lower end, and a first plurality of holes extending through the tapered upper wall, and a lower section having a tapered lower wall extending from the lower end of the upper section to a bottom wall, and a second plurality of holes extending through the tapered lower wall, the bottom wall extending to a bottom of the lower section, wherein the bottom wall and bottom together define a waste chamber having a volume, wherein a material forming at least a portion of the waste chamber is highly visible when the drain basket is installed in the plumbing drain. The chemical blend includes an active ingredient such that a specified amount of the chemical blend in an amount of water corresponding to the volume of the waste chamber provides a solution in which the active ingredient forms between 5.0% and 30.0% of the solution.

In one aspect, a kit for capturing hair or waste in a plumbing drain includes a plurality of drain basket components. The drain basket components include a top piece including a tapered upper wall having an upper end and a lower end, and a plurality of top holes extending through the tapered upper wall, and a top connector extending from the lower end of the tapered upper wall. The drain basket components include a first bottom piece including a first tapered lower wall having an upper end and a lower end, and extending to a first bottom wall, and a first plurality of bottom holes extending through the first tapered lower wall, the first bottom wall extending to a bottom of the first bottom piece, wherein the first bottom wall and bottom of the first bottom piece together define a first waste chamber having a first volume, the first bottom piece further having a first bottom connector extending from the upper end of the first tapered lower wall and constructed and arranged to mate with the top connector to attach the top piece to the first bottom piece. The drain basket components include a second bottom piece including a second tapered lower wall having an upper end and a lower end, and extending to a second bottom wall, and a second plurality of bottom holes extending through the second tapered lower wall, the second bottom wall extending to a bottom of the second bottom piece, wherein the second bottom wall and bottom of the second bottom piece together define a second waste chamber having a second volume larger than the first volume, the second bottom piece further having a second bottom connector extending from the upper end of the second tapered lower wall and constructed and arranged to mate with the top connector to attach the top piece to the second bottom piece.

In one aspect, a kit for capturing hair or waste in a plumbing drain includes a plurality of drain basket components and first and second chemical blends. The drain basket components include a top piece including a tapered upper wall having an upper end and a lower end, and a plurality of top holes extending through the tapered upper wall, and a top connector extending from the lower end of the tapered upper wall. The drain basket components include a first bottom piece including a first tapered lower wall having an upper end and a lower end, and extending to a first bottom wall, and a first plurality of bottom holes extending through the first tapered lower wall, the first bottom wall extending to a bottom of the first bottom piece, wherein the first bottom wall and bottom of the first bottom piece together define a first waste chamber having a first volume, the first bottom piece further having a first bottom connector extending from the upper end of the first tapered lower wall and constructed and arranged to mate with the top connector to attach the top piece to the first bottom piece. The drain basket components include a second bottom piece including a second tapered lower wall having an upper end and a lower end, and extending to a second bottom wall, and a second plurality of bottom holes extending through the second tapered lower wall, the second bottom wall extending to a bottom of the second bottom piece, wherein the second bottom wall and bottom of the second bottom piece together define a second waste chamber having a second volume larger than the first volume, the second bottom piece further having a second bottom connector extending from the upper end of the second tapered lower wall and constructed and arranged to mate with the top connector to attach the top piece to the second bottom piece. The first chemical blend includes a first formulation comprising an active ingredient such that a specified amount of the first chemical blend in an amount of water corresponding to the first volume of the first waste chamber provides a first solution in which the active ingredient forms between 5.0% and 30.0% of the first solution. The second chemical blend includes a second formulation different from the first formulation and comprising an active ingredient such that a specified amount of the second chemical blend in an amount of water corresponding to the first volume of the first waste chamber provides a second solution in which the active ingredient forms a different proportion of the second solution than the first solution.

In any of the foregoing, in the drain basket, the tapered upper wall further can support an upper baffle extending from an interior surface of the upper end of the tapered upper wall, the upper baffle extending along the tapered upper wall to cover at least some holes in the first plurality of holes, and wherein the upper baffle is angled inwards away from the tapered upper wall.

In any of the foregoing, in the drain basket, a material forming at least a portion of the waste chamber can be highly visible when the drain basket is installed in the plumbing drain.

In any of the foregoing, in the drain basket, the first connector can include a first threaded section extending from the lower end of the tapered upper wall, and the second connector can include a second threaded section extending from the upper end of the tapered lower wall and having second threading mating with the first threading to form a threaded connection between the bottom piece and the top piece.

In any of the foregoing, in the drain basket, when the top piece and the bottom piece are threaded together, the top piece and the bottom piece together can define the drain basket.

In any of the foregoing, in the drain basket, when the top piece and the bottom piece are attached together using a first connector and a second connector, the top piece and the bottom piece together can define the drain basket.

In any of the foregoing, in the drain basket, the tapered lower wall further can support a lower baffle extending from an interior surface of the upper end of the tapered lower wall, the lower baffle extending along the tapered lower wall so as to cover at least some holes in the second plurality of holes, and wherein the lower baffle is angled inwards away from the tapered lower wall.

In any of the foregoing, in the drain basket, the top piece further can support a lower baffle extending from a bottom of the top piece, wherein, when the top piece and the bottom piece are attached, the lower baffle extends along the tapered lower wall of the bottom piece so as to cover at least some holes in the second plurality of holes and is angled inwards away from the tapered lower wall.

In any of the foregoing, in the drain basket, the upper section further can include an upper cylindrical wall section extending upwards from the upper end of the tapered upper wall.

In any of the foregoing, in the drain basket, an upper cylindrical wall section further can include a support structure for supporting the drain basket on an inlet of the plumbing drain.

In any of the foregoing, in the drain basket, holes in the first plurality of holes can have a larger diameter than holes in the second plurality of holes.

In any of the foregoing, in the drain basket, the first plurality of holes can include a first set of holes at the upper end of the tapered upper wall, and a second set of holes at the lower end of the tapered upper wall, and wherein holes in the first set have a larger diameter than holes in the second set.

In any of the foregoing, in the drain basket, the second plurality of holes can include a third set of holes at an upper end of the tapered lower wall, and a fourth set of holes at a lower end of the tapered lower wall, and wherein holes in the third set have a larger diameter than holes in the fourth set.

In any of the foregoing, in the drain basket, at least one of the bottom wall and the bottom forming the waste chamber can include one or more holes having a diameter such that hair or waste in the waste chamber is likely to clog the one or more holes.

In any of the foregoing, the drain basket can be constructed from stainless steel, a plastic material, material formed through additive manufacturing, or material formed through injection molding.

In any of the foregoing, the chemical blend can consist of, consist essentially of, comprise, or include one or more ingredients, including at least the active ingredient.

In any of the foregoing the one or more ingredients can include a caustic active ingredient, such as sodium hydroxide, potassium hydroxide, or a formulation of at least sodium hydroxide and potassium hydroxide. A formulation of about 75% sodium hydroxide and about 25% potassium hydroxide can be used.

In any of the foregoing the one or more ingredients can include a depilatory ingredient, such as sodium thioglycolate.

In any of the foregoing the one or more ingredients can include a surfactant ingredient. The surfactant ingredient can be an ingredient that controls reaction time of the caustic ingredient with hair or waste captured in the waste chamber. A surfactant ingredient can include one or more of sodium dodecyl sulfate, a secondary alcohol ethoxylate, nonionic surfactant, sodium silicate, sodium tripolyphosphate, or sodium hypochlorite.

In any of the foregoing the one or more ingredients can include an enzyme that breaks down hair or waste, such one or more of as keratinase, amylase, lipase, or trypsin.

In any of the foregoing the one or more ingredients can include a thickener, such as one or more of xanthan gum, sodium carboxymethyl cellulose, sodium lauryl sulfoacetate, stearic acid, lauric acid, or sodium lauryl ether sulfate.

In any of the foregoing, the chemical blend can consist of, consist essentially of, comprise, or include a formulation of sodium hydroxide, potassium hydroxide, and sodium thioglycolate.

In any of the foregoing, the chemical blend can consist of, consist essentially of, comprise, or include a formulation of sodium hydroxide, potassium hydroxide, sodium thioglycolate, and sodium tripolyphosphate.

In any of the foregoing, the chemical blend can consist of, consist essentially of, comprise, or include a formulation of sodium hydroxide, potassium hydroxide, sodium thioglycolate, sodium tripolyphosphate, and one or more of keratinase, amylase, lipase, or trypsin.

In any of the foregoing, the chemical blend can consist of, consist essentially of, comprise, or include a formulation of sodium hydroxide, potassium hydroxide, sodium thioglycolate, sodium tripolyphosphate, sodium carboxymethyl cellulose, and one or more of keratinase, amylase, lipase, or trypsin.

In any of the foregoing, the chemical blend can be supported in a medium, such as a liquid, a powder, a granular medium, a gel, a water-based solution, or a water-based solution including a thickening agent.

In any of the foregoing, the chemical blend can include an odor-effecting ingredient, such as a citrus concentrate or other natural odor producing ingredient.

It should be understood that the subject matter defined in the appended claims is not necessarily limited to the specific implementations described above. The specific implementations described above are disclosed as examples only.

What is claimed is:

1. A drain basket for capturing hair or waste in a plumbing drain, comprising:
   an upper section including a tapered upper wall having an upper end and a lower end, and a first plurality of holes extending through the tapered upper wall, the tapered upper wall further supporting an upper baffle extending from an interior surface of the upper end of the tapered upper wall, the upper baffle extending along the tapered upper wall so as to cover at least some holes in the first plurality of holes, and wherein the upper baffle is angled inwards away from the tapered upper wall; and
   a lower section having a tapered lower wall extending from the lower end of the upper section to a bottom wall, and a second plurality of holes extending through the tapered lower wall, the bottom wall extending to a bottom of the lower section, wherein the bottom wall and bottom together define a waste chamber having a volume.

2. The drain basket of claim 1, wherein a material forming at least a portion of the waste chamber is highly visible when the drain basket is installed in the plumbing drain.

3. The drain basket of claim 1, wherein the tapered lower wall further supports a lower baffle extending from an interior surface of the upper end of the tapered lower wall, the lower baffle extending along the tapered lower wall so as to cover at least some holes in the second plurality of holes, and wherein the lower baffle is angled inwards away from the tapered lower wall.

4. The drain basket of claim 1, wherein the upper section further includes a support structure for supporting the drain basket on an inlet of the plumbing drain.

5. The drain basket of claim 1, wherein holes in the first plurality of holes have a larger diameter than holes in the second plurality of holes.

6. The drain basket of claim 5, wherein the first plurality of holes includes a first set of holes at the upper end of the tapered upper wall, and a second set of holes at the lower end of the tapered upper wall, and wherein holes in the first set have a larger diameter than holes in the second set.

7. The drain basket of claim 6, wherein the second plurality of holes includes a third set of holes at an upper end of the tapered lower wall, and a fourth set of holes at a lower end of the tapered lower wall, and wherein holes in the third set have a larger diameter than holes in the fourth set.

8. A kit for capturing hair or waste in a plumbing drain, comprising:
   a plurality of drain basket components including:
      a top piece including a tapered upper wall having an upper end and a lower end, and a plurality of top holes extending through the tapered upper wall, and a top connector extending from the lower end of the tapered upper wall;
      a first bottom piece including a first tapered lower wall having an upper end and a lower end, and extending to a first bottom wall, and a first plurality of bottom holes extending through the first tapered lower wall, the first bottom wall extending to a bottom of the first bottom piece, wherein the first bottom wall and bottom of the first bottom piece together define a first waste chamber having a first volume, the first bottom piece further having a first bottom connector extending from the upper end of the first tapered lower wall and constructed and arranged to mate with the top connector to attach the top piece to the first bottom piece;
      a second bottom piece including a second tapered lower wall having an upper end and a lower end, and extending to a second bottom wall, and a second plurality of bottom holes extending through the second tapered lower wall, the second bottom wall extending to a bottom of the second bottom piece, wherein the second bottom wall and bottom of the second bottom piece together define a second waste chamber having a second volume larger than the first volume, the second bottom piece further having a second bottom connector extending from the upper end of the second tapered lower wall and constructed and arranged to mate with the top connector to attach the top piece to the second bottom piece;
   a first chemical blend including a first formulation comprising an active ingredient such that a specified amount of the first chemical blend in an amount of water corresponding to the first volume of the first waste chamber provides a first solution in which the active ingredient forms between 5.0% and 30.0% of the first solution; and
   a second chemical blend including a second formulation different from the first formulation and comprising an active ingredient such that a specified amount of the second chemical blend in an amount of water corresponding to the first volume of the first waste chamber provides a second solution in which the active ingredient forms a different proportion of the second solution than the first solution.

9. The kit of claim 8, wherein the tapered upper wall further supports an upper baffle extending from an interior surface of the upper end of the tapered upper wall, the upper baffle extending along the tapered upper wall to cover at least some holes in the first plurality of holes, and wherein the upper baffle is angled inwards away from the tapered upper wall.

10. The kit of claim 9, wherein the top piece further supports a lower baffle extending from a bottom of the top piece, wherein, when the top piece and the bottom piece are attached using the first connector and the second connector, the lower baffle extends along the tapered lower wall of the bottom piece so as to cover at least some holes in the second plurality of holes and is angled inwards away from the tapered lower wall.

11. The kit of claim 8, wherein a material forming at least a portion of the waste chamber is highly visible when the drain basket is installed in the plumbing drain.

12. The kit of claim 8, wherein:
   the first connector comprises a first threaded section extending from the lower end of the tapered upper wall, and
   the second connector comprises a second threaded section extending from the upper end of the tapered lower wall and having second threading mating with the first threading to form a threaded connection between the bottom piece and the top piece.

13. The kit of claim 8, wherein, when the top piece and the bottom piece are threaded together, the top piece and the bottom piece together define the drain basket.

14. A system for capturing hair or waste in a plumbing drain, comprising:

a drain basket, comprising;
- an upper section including a tapered upper wall having an upper end and a lower end, and a first plurality of holes extending through the tapered upper wall, the tapered upper wall further supporting an upper baffle extending from an interior surface of the upper end of the tapered upper wall, the upper baffle extending along the tapered upper wall so as to cover at least some holes in the first plurality of holes, and angled inwards away from the tapered upper wall, and
- a lower section having a tapered lower wall extending from the lower end of the upper section to a bottom wall, and a second plurality of holes extending through the tapered lower wall, the bottom wall extending to a bottom of the lower section, wherein the bottom wall and bottom together define a waste chamber having a volume; and a chemical blend comprising an active ingredient such that a specified amount of the chemical blend in an amount of water corresponding to the volume of the waste chamber provides a solution in which the active ingredient forms between 5.0% and 30.0% of the solution.

15. The system of claim 14, wherein a material forming at least a portion of the waste chamber is highly visible when the drain basket is installed in the plumbing drain.

16. The system of claim 14, wherein the chemical blend comprises a caustic active ingredient.

17. The system of claim 16, wherein the caustic active ingredient comprises at least sodium hydroxide.

18. The system of claim 17, wherein the chemical blend is supported in a medium.

19. The system of claim 18, wherein the medium supporting the chemical blend is a liquid.

20. The system of claim 18, wherein the medium supporting the chemical blend is a powder.

* * * * *